United States Patent [19]
Shaw et al.

[11] Patent Number: 5,492,348
[45] Date of Patent: Feb. 20, 1996

[54] VEHICLE STEERING SYSTEM

[76] Inventors: David C. Shaw; Judy Z. Shaw, both of 3312 E. Mandeville Pl., Orange, Calif. 92667

[21] Appl. No.: 281,628

[22] Filed: Jul. 28, 1994

Related U.S. Application Data

[63] Continuation-in-part of Ser. No. 140,865, Oct. 25, 1993, which is a continuation-in-part of Ser. No. 953,083, Sep. 29, 1992, Pat. No. 5,307,891.

[51] Int. Cl.$^6$ .................. B62D 1/20; B62D 5/04
[52] U.S. Cl. .................. 180/79.1; 180/79; 180/140; 180/142; 180/143; 180/197
[58] Field of Search ................. 180/79.1, 140, 180/141, 142, 197, 143; 280/91; 364/426.03, 426.04

[56] References Cited

U.S. PATENT DOCUMENTS

| | | | |
|---|---|---|---|
| 4,763,262 | 8/1988 | Leiber | 180/197 |
| 5,226,499 | 7/1993 | Kanezawa et al. | 180/79.1 |
| 5,379,222 | 1/1995 | Anan et al. | 180/197 |

*Primary Examiner*—Mitchell J. Hill

[57] ABSTRACT

A vehicle steering system provides four distinct steering modes, including a first steering mode for steerage of front wheels with rear wheels neutral, a second steering mode for steerage of rear wheels with front wheels neutral, a third steering mode for coincidence-phase steerage of front wheels and rear wheels, and a fourth steering mode for reverse-phase steerage of front wheels and rear wheels. In the first embodiment, a specially elongated pinion shaft includes two groups of pinion gears. One of the first group pinion gears meshes with a gear on a steering rack for front wheels; and, simultaneously, one of the second group pinion gears meshes with a gear on a steering rack for the rear wheels. A vehicle user can shift the steering shaft to one of four operating positions, each operating position providing a distinct steering mode. In a modified design, a pinion steering shaft includes a group of pinion gears to engage a steering rack for the front wheels; while the rear wheels are steered by an electric motor controlled by electronic devices. In the second embodiment, both the front wheels and rear wheels are steered by electric motors controlled by electronic devices to provide four steering modes. In another modified design, the front wheels are steered by an electric motor controlled by electronic devices.

23 Claims, 14 Drawing Sheets

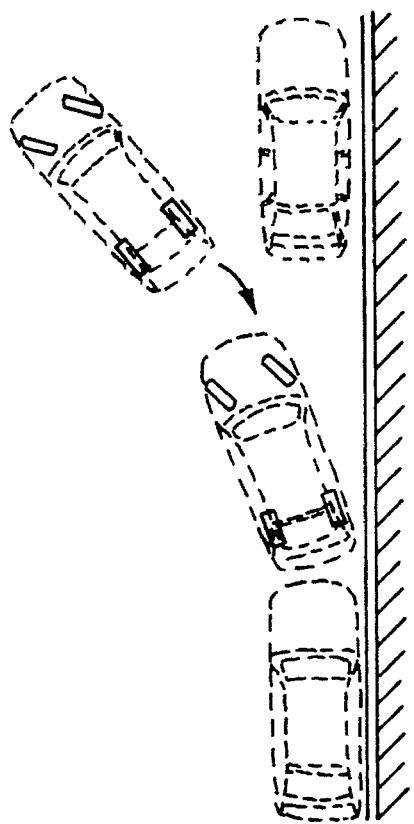
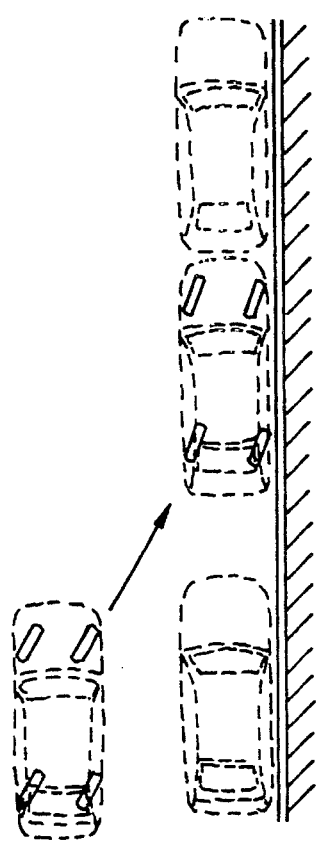
Fig. 11A
Fig. 11B
11A. Ordinary Vehicle
11B. Steering Mode Three, for narrow space.
11C. Steering Mode Three, for very narrow space.
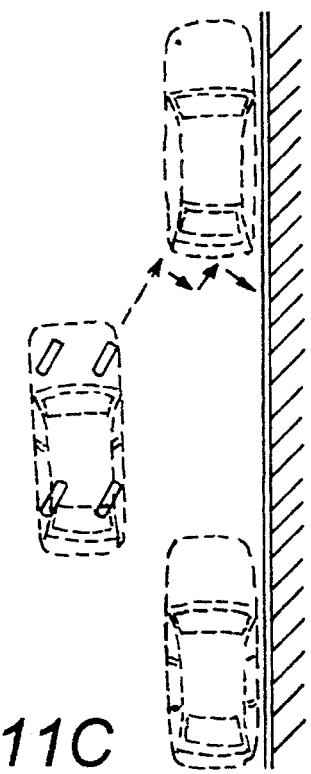
Fig. 11C

VEHICLE STEERING SYSTEM

BACKGROUND ART

This patent application is a continuation-in-part of our co-pending patent application, ser. No. 08/140,865, filed on Oct. 25, 1993; the latter being a continuation-in-part of our former patent application, serial No. 07/953,083, filed Sept. 29, 1992, now U.S. Pat. No. 5,307,891, granted on May 3, 1994.

TECHNICAL FIELD

This invention relates to automotive steering systems, and more particularly to four-wheel steering systems.

This invention was the subject matter of Document Disclosure Program Registration Numbers 309646, 310441 and 312981 which were filed in the United States Patent and Trademark Office on May 18, 1992, May 26, 1992 and Jul. 15, 1992 respectively.

It has been well known that steering the front wheels and rear wheels in opposite direction, so called reverse-phase direction steering, in slow vehicle speed can achieve small turning radius capability. However, the rear portion of the vehicle can be projected outward during forward driving under the reverse-phase direction steering.

It also has been demonstrated that steering the front wheels and the rear wheels in the same direction, so called coincidence-phase direction steering, in high vehicle speed can promote the stability of the vehicle and decrease the possibility of lateral wheel skidding.

During direction changing at high vehicle speed, the centrifugal force can produce lateral skidding of the wheels or spinning of the vehicle. Although the coincidence-phase direction steering can reduce or prevent lateral skidding of wheels, it can create the problems of understeering and decreased yawing. Yawing refers to the change of vehicle orientation, which is necessary for a vehicle to change its direction.

In U.S. Pat. No. 5,103,925, Imaseki et al. disclosed a real wheel steering system which steered rear wheels in coincidence-phase direction for rear-wheel drive vehicles, and in reverse-phase direction for front-wheel drive vehicles, to prevent driven wheel slippage during cornering at high vehicle speed.

In a U.S. Pat. No. 4,979,116, Dec. 18, 1990, Takahashi described an invention which included a steering-speed dependent reference value of the rear wheel steered angle. At high or medium vehicle speed, the rear wheel steering speed reference value was controlled to reduce the coincidence-phase direction steering speed of the rear wheels at low front wheel steering speed; and to increase the coincidence-phase direction steering speed of the rear wheels at high front wheel steering speed. By this design, Takahashi was able to delay the starting of the coincidence-phase steering of the rear wheels during slow speed of the steering wheel. When the steering wheel was turned abruptly at medium or high vehicle speed, the rear wheels were quickly steered in the coincidence-phase. However, this type of design may incorrectly interfere with the driver's intention and produce a feeling of loss of steering control.

In U.S. Pat. No. 5,048,629, Sept. 17, 1991, Abe et al. described an invention in which the rear wheels were steered by a variable steering ratio which was predetermined in matching relation to the vehicle speed.

In a U.S. Pat. No. 5,076,597, Dec. 31, 1991, Korekan et al. disclosed an invention in which the rear wheel steering was determined by three different ranges of steering wheel rotation. In the first angular range of steering wheel rotation, the rear wheels were steered in coincidence-phase. In the second angular range of the steering wheel rotation, the rear wheels were held in the neutral direction. When the steering wheel was rotated above the second angular range, the rear wheels were steered in the reverse-phase.

In another U.S. Pat. No. 5,083,627, Jan. 28, 1992, Kawamoto et al. disclosed a rear wheel steering mechanism in which the rear wheel steerage was based on both the front wheel steered angle and the vehicle speed.

In the above prior art inventions, the rear wheels are steered indirectly, depending on the vehicle speed, and/or the steering wheel angle, and/or the steering wheel rotating speed. Therefore, in these types of designs, the rear wheel steered angle does not have a constant relationship with the rotated angle of the steering wheel. Because of this, the yawing rate is variable in these prior art inventions. Accordingly, the steering efficiency is quite variable and unpredictable in these prior art four-wheel steering systems.

For the conventional front-wheel steering vehicles, the relationship between the steering wheel rotation and the vehicle orientation change is predictable for the driver. Constant and predictable steering efficiency provides the best steering feedback and steering control for the driver. However this is often lost in the prior art four-wheel steering systems. In the above prior art inventions, the rear wheel steerage does not have a constant relationship with the steering wheel rotation. Thus the steering feedback becomes unpredictable and the driver may have a feeling of loss of steering control. The present invention will solve this problem by promoting constant steering efficiency, although modification can still be adopted in very high speed and dangerous situations to prevent wheel skidding.

There is a dilemma not totally solved by the prior art inventions. It is well known that the reverse-phase steering at slow vehicle speed has the advantage of very small turning radius. However, the prior art inventions can not effectively utilize this advantage because the rear portion of the vehicle is projected outward during forward driving with reverse-phase steering. To prevent this problem, some prior art inventions use designs to delay the rear wheel steering until after the vehicle has traveled a predetermined distance, or until the vehicle has exceeded a certain speed. In another prior art invention, U.S. Pat. No. 5,048,835, Sept. 17, 1991, Trefz et al, disclosed a dwell period between the movement of the front and that of the rear steering assemblies. However, with these types of designs, the benefit of small turning radius capability is significantly degraded.

In the present invention, the reverse-phase steering is utilized separately and independently under "Steering Mode Four". The "Steering Mode Four" will be used only when the driver needs to make very small turning radius at slow speed. It is true that under the "Steering Mode Four" of this invention, the rear portion of the vehicle will still be projected outward during forward driving, and the front portion will be projected outward during backward driving. However, since this phenomenon occurs only when the driver select this particular steering mode, the driver can easily pay attention to the surroundings so that the vehicle does not collide with anything near its sides. This phenomenon will not occur when the driver select other steering modes.

It is well known that when driving a conventional vehicle backward, the front portion of the vehicle is projected outward. The present invention provides another steering mode, "Steering Mode Two", with rear wheel steerage, to solve this problem.

In many prior art inventions, the front and rear wheels are steered in the reverse-phase in a slow vehicle speed range, and in the coincidence-phase in a high vehicle speed range. These prior art inventions mix the reverse-phase steering and the coincidence-phase steering into a same steering mode. In the foregoing Korekan patent, the coincidence-phase steering, regular front-wheel steering and the reverse-phase steering are all mixed into one steering mode. However, it is well known that each of these different steering methods has its own advantages and disadvantages and that the advantages and disadvantages of one steering method often contradict those of the other steering methods. Even with the various designs of the prior art inventions, none of them were able to solve these contradictions completely.

The present invention provides a multiple steering mode system which can make every steering method independent of the other steering methods. This multiple steering mode system can be easily operated by the driver and can solve all of the above problems.

BRIEF DISCLOSURE THE INVENTION

The present invention includes novel, improved four-wheel steering systems for vehicles with steerable front wheels and steerable rear wheels. This invention can provide a specific choice among a plurality of different steering modes. The vehicle user can easily select any one of the steering modes. Each steering mode provides a specific and distinct relationship between the front wheel steerage and the rear wheel steerage. This multiple steering mode system can provide several very valuable advantages.

The function of each steering mode is as following:

Steering Mode One: The steering wheel is used to steer the two front wheels. Rear wheels are kept at a neutral direction. This will be the most commonly used steering mode.

Steering Mode Two: The steering wheel is used to steer the two rear wheels. The front wheels are kept at the neutral direction. This mode will be used for backward driving.

Steering Mode Three: The steering wheel will be used to steer the front wheels and rear wheels simultaneously in exactly the same direction, i.e. complete coincidence-phase direction. This will be used in slow vehicle speed to move the vehicle in oblique direction without any associated change of the vehicle orientation. This mode will be used in road-side parking and in maneuvering the vehicle into and out of very crowded areas.

Steering Mode Four: The steering wheel will be used to steer the front wheels and the rear wheels in opposite direction, i.e. reverse-phase direction. This mode can achieve very small turning radius at slow vehicle speed.

The driver can select any particular steering mode through a steering mode selector. The steering mode selector includes a shift lever, or a shift lever integrated with a multi-switch device, or a selection-button device, detail to be described later. The detail of the mechanical or electronic designs of the multiple steering mode system will also be described hereinafter.

The provision of a specific choice among a plurality of multiple steering modes can achieve several distinct advantages.

The major advantages are that this multiple steering mode system can solve all of the aforementioned problems of prior art inventions. In the multiple steering mode system of the present invention, each different steering method comprises a separate steering mode. Each steering mode can be utilized independently. Thus, the vehicle can be steered under only one of the steering modes to fully enjoy the advantages and benefits of each steering mode. The independence of each steering mode can avoid any degradation of the benefits of each steering method due to mixture with other steering methods. More specifically, the problem of partial loss of the small turning radius capability during reverse-phase steering, as in most prior art inventions, can be avoided. Only partial coincidencephase steering is utilized, at high speed, by most prior art inventions. The present invention includes a steering mode which provides complete coincidence-phase steering having no associated change of vehicle orientation. The benefits of this steering mode will be described hereinafter. This invention will give the driver better steering feedback and steering control. Utilization of partial coincidence-phase steering at high vehicle speed to improve cornering stability and to prevent wheel skidding can be easily incorporated into the modified first embodiment and the second embodiment of this invention.

This invention provides two special steering methods. These two special steering methods can not be effectively utilized in prior art inventions because they do not have a mechanism to change the front wheel steerage.

One of the special steering methods is to steer only the rear wheels during backward driving. This is a much easier method to drive a vehicle backward, including when backing a car out of a parking space. With this steering method, the front portion of the car will not be projected outward during turning in backward driving. The turning radius for backward driving will be significantly decreased. Another benefit is that it is much easier for the driver to control the vehicle direction when only the rear wheels are steered in backward driving.

As illustrated in FIG. 10, the front portion of an ordinary car is projected outward when the vehicle is turned during backward driving. Because of this, the driver of the ordinary car needs to wait until most part of the car is out of the parking slot before the driver can rotate the steering wheel. This problem can be avoided by rear wheel steerage, as under the Steering Mode Two of this invention. So vehicles with this Steering Mode Two will have a much smaller turning radius when being driven out of a parking slot. This will improve ease of backward driving and promote saving of parking lot space. This invention, with a mechanism which provides choices of multiple steering modes, can easily and effectively utilize this special backward steering method.

The second special steering method is complete coincidence-phase direction steering under relatively slow speed so that the vehicle can be moved in oblique direction without any change of vehicle orientation. When the front wheels and rear wheels are steered to exactly the same direction, the vehicle can be moved in an unique way, i.e. moved in the oblique direction with no change of orientation. This unique oblique movement is the easiest method of steering for road-side parking, especially when the space is narrow. This is also a very effective steering method when the driver wants to maneuver a vehicle into or out of a very crowded area.

FIG. 11 illustrates the comparison between an ordinary vehicle and a vehicle with Steering Mode Three of this invention during road-side parking with narrow space. The ordinary vehicle with front wheel steerage will move in curved direction. With narrow space, the driver will have difficulty to properly orient the ordinary vehicle into this narrow space. Whereas a vehicle with the Steering Mode Three of the present invention can be driven in oblique directions in straight line, with no change of the vehicle orientation. Therefore vehicle equipped with this Steering Mode Three can be easily directed into a narrow road-side parking space. Even when the space is big enough, this is still a much easier and better steering method for road-side parking. For extremely narrow road-side parking space, a four-wheel steering vehicle with Steering Mode Three can be driven into the very narrow space with a series of zig-zag type oblique movements, as shown in FIG. 11.

Two preferred embodiments are disclosed. The first preferred embodiment includes a novel mechanical design having a special long pinion steering shaft which carries two sets of pinion gears. One set of pinion gears engage a gear on a front wheel steering rack; and another set of pinion gears engage a gear on a rear wheel steering rack. With a shift lever, which functions as a steering mode selector, the vehicle user can shift this special long pinion steering shaft to four specific operating positions. Each operating position provides a mechanism for one specific steering mode. Worm steering shaft, associated with worm gears, ball nuts and pitman arm shafts, can be similarly applied to this invention.

The second preferred embodiment is a novel electronic design, including electric motors and/or hydraulic pressure controllers, steering wheel rotation sensor, a speedometer and a steering mode selector to electronically control the steerage of both front wheels and rear wheels. The steering mode selector is usually a design with selection buttons. Both the first and the second preferred embodiments include the foregoing four steering mode system.

The above four steering mode system is also applied to modified designs for the first preferred embodiment, wherein the front wheels are controlled by the novel mechanical design with special long pinion shaft carrying a plurality of gears, and the rear wheels are controlled by an electronic steering design.

To promote safety, a master button or actuator design having three gate-keeper type functions is also disclosed to regulate the steering mode selection and to prevent inadvertent change of the steering mode. One of the function is that steering mode can be changed only when the vehicle is not moving. The other function is that before any steering mode change all wheels will be moved to neutral direction.

Another optional design will automatically select the Steering Mode Two when the vehicle user engages the reverse transmission gear. This can promote the driver's convenience.

Most of the prior art four-wheel steering systems are primarily suitable for automobiles. However, the four-wheel steering systems of the present invention are applicable not only to automobiles and trucks, but also to motorized fork lifts, motorized cranes and other special industrial vehicles. This is due to the fact that part of the advantages of the present invention are best utilized at relatively slow vehicle speed in a very crowded space.

The electronic steerage for both the front wheels and rear wheels can provide other advantages, especially in high vehicle speed and in dangerous situations. Input signals from various detectors can be easily incorporated into the microcomputer system such that the steerage is modified by vehicle speed, wheel locking, vehicle body tilting or wheel skidding. In a modified design of the second embodiment, the front wheels are steered by the electronic devices. This simplified design can provide part of these advantages.

BRIEF DESCRIPTION Of THE DRAWINGS

These and other attributes of the invention will become more clear upon a thorough study of the following description of the preferred embodiments for carrying out the invention, particularly when reviewed in conjunction with the drawings, wherein:

FIG. 11 is a schematic view of two vehicles each equipped with a four-wheel steering system of this invention driving into a narrow road-side parking space (FIG. 11-B) or into an extremely narrow road-side parking space (FIG. 11-C) under the Steering Mode Three, as compared with an ordinary vehicle (FIG. 11-A) having difficulty to do the same;

PREFERRED EMBODIMENTS FOR CARRYING OUT The Present Invention

The First Preferred Embodiment

Figure 1:
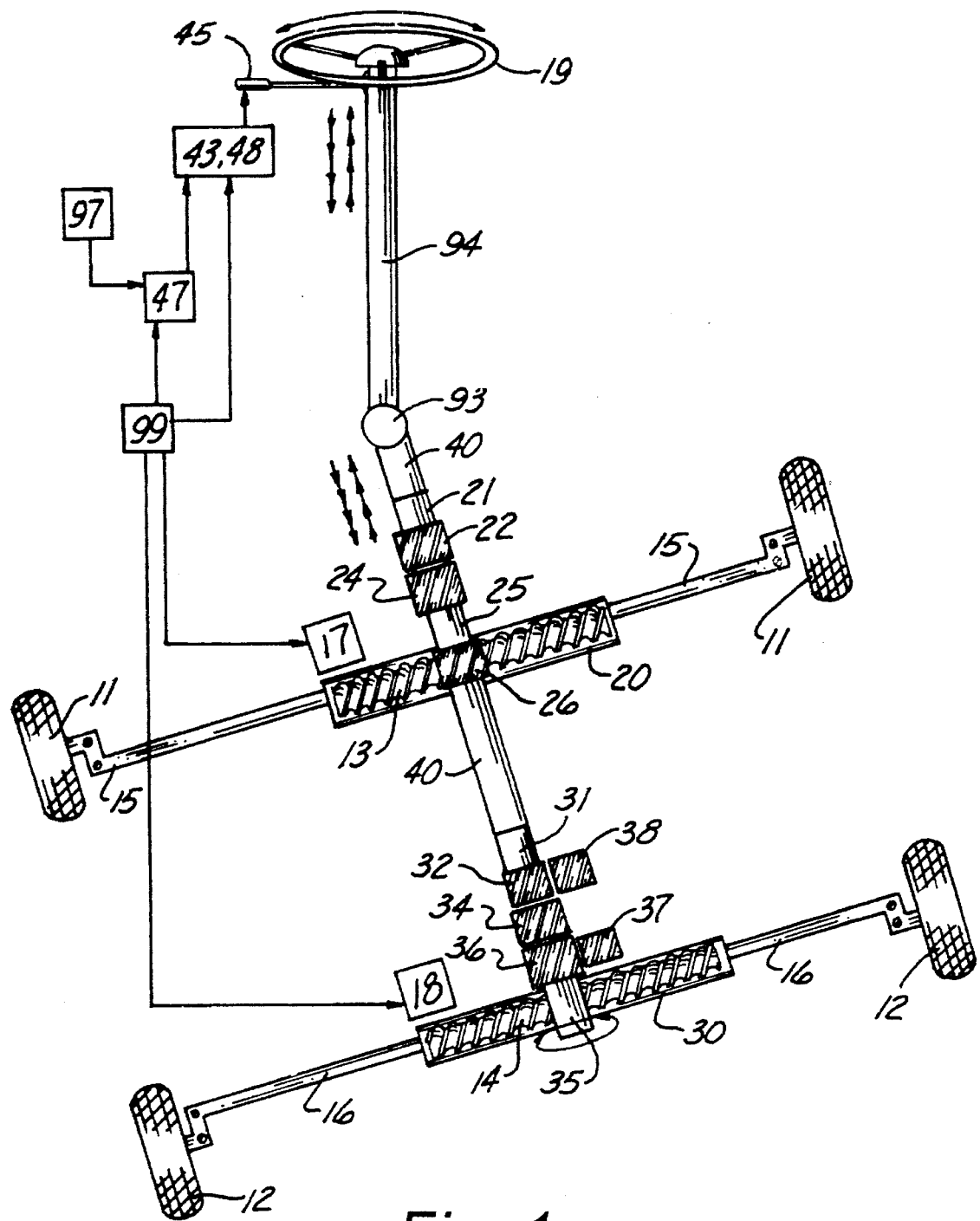
FIG. 1 is a schematic drawing illustrating the first embodiment of the present invention, with choices of multiple steering modes, with the front wheels and rear wheels under direct mechanical control.

In the first preferred embodiment of this invention, as illustrated in FIG. 1, the turning of the front wheels (11) is controlled by a front steering rack (20), and the turning of the rear wheels (12) is controlled by a rear steering rack (30). Both the front and the rear steering racks (20, 30) are under simultaneous control by a novel specially elongated steering shaft (40). This elongated steering shaft (40) is connected to a single steering wheel (19) operably controlled by a vehicle user.

This is a novel design. In majority of prior art inventions, the rear wheels are steered indirectly by an electric motor which was controlled by a microcomputer and various sensors. The indirect steerage could be prone to failure or malfunctioning and could be dangerous. The direct mechanical steerage of all four wheels can avoid this type of problem.

The front and the rear steering racks (20, 30) are connected via front and rear steering linkages (15, 16) to the front and rear wheels (11, 12) respectively. Rack gears (13, 14) on these two steering racks (20, 30) simultaneously mesh with different gears on the elongated steering shaft (40). The steering shaft (40) and the steering racks (20, 30) are disposed in a way such that the steering racks will not be displaced in an up-and-down or a forward-backward direction; whereas the steering shaft (40) can be shifted either up-and-down or forward-backward to different operating positions such that different specific gears on the steering shaft can mesh with the rack gears (13, 14) on the steering racks (20, 30).

There are several different steering devices currently used by car manufacturers. The popular ones include manual pinion and rack steering device, manual recirculating ball steering with worm gears and pitman arm shaft, the powered version of the pinion and rack steering device, the powered version of the recirculating ball worm gears steering and several other types. For simplicity, in this disclosure only the basic rack and pinion steering device and the basic recirculating ball with worm gears and pitman arm shaft steering device are described, although it should be understood that the teachings of this invention can be applied to other types of steering devices. The powered steering versions are preferred in this invention.

Figure 2:
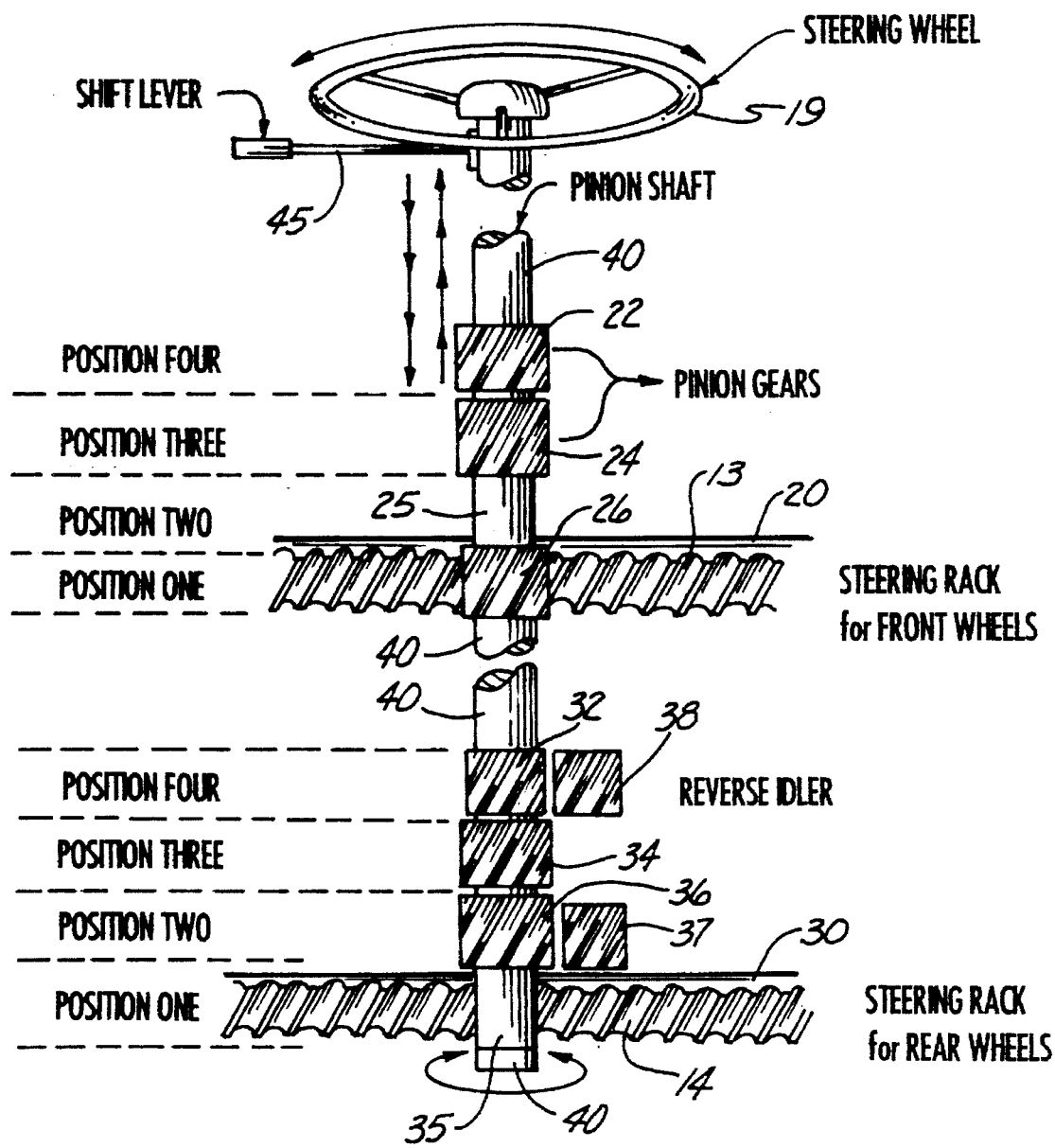
FIG. 2 is a schematic drawing illustrating the first embodiment of this invention using a basic rack and pinion steering structure.
Figure 3:
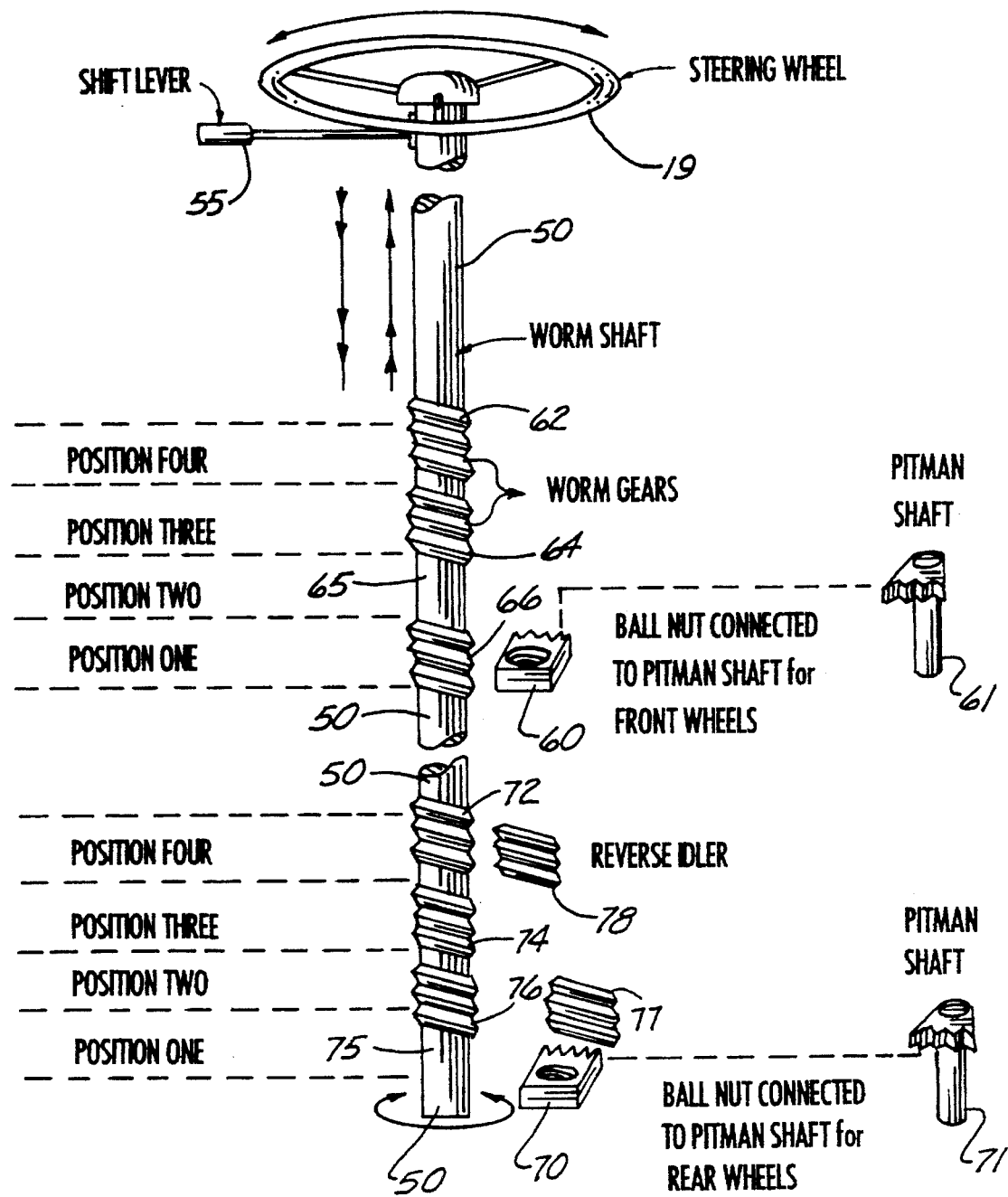
FIG. 3 is a schematic drawing of the first embodiment using a basic recirculating ball worm and sector steering structure.

A plurality of gears are disposed on the specially elongated steering shaft (40), including a plurality of pinion gears arrayed on a pinion shaft for a rack and pinion type steering, and a plurality of worm gears arrayed on a worm shaft for a recirculating ball type steering. The disposition of these gears can be designed in many different ways. In FIGS. 1, 2 and 3, simplified diagrams are used to show the basic designs.

For a rack and pinion type steering device, as shown in FIGS. 1 and 2, a front set of pinion gears (22, 24 and 26) and a rear set of pinion gears (32, 34 and 36) are arrayed on the elongated pinion steering shaft (40). Each set of the pinion gears further includes at least one void gear space (25, 35). A front rack gear (13) is disposed on the front steering rack (20), and a rear rack gear (14) is disposed on the rear steering rack (30). Either one of the front set pinion gears (22, 24 or 26) or the front void gear space (25) engages the front rack gear (13) to steer the front wheels (11) via front steering linkages (15). Similarly, either one of the rear set pinion gears (32, 34 or 36) or the rear void gear space (35) engages the rear rack gear (14) to steer the rear wheels (12) via rear steering linkages (16).

This invention further includes a steering mode selector. Many different designs are applicable for the steering mode selector. As an example, a steering shift lever (45) can function as a steering mode selector. The vehicle user can operate the steering shift lever (45) to shift the pinion shaft (40) to a plurality of distinct operating positions. The shift lever (45) is attached to a connection element (94) between the steering wheel (19) and the steering shaft. A joint structure (93) is incorporated into the connection element between the steering wheel and the steering shaft (40) to provide room for displacement of the steering shaft by the shift lever (45). Examples of the joint structures include a sliding joint or a telescoping joint (of conventional structure, detail not shown in figures). The sliding joint or the telescopic joint allow some room to move the pinion shaft (40) up-and-down or forward-backward to the four distinct operating positions. The steering shaft (40), as an optional design, may include another joint structure located between the first set pinion gears (22, 24 and 26) and the second set pinion gears (32, 34 and 36) to allow temporary dissociation between the front set pinion gears and the rear set pinion gears.

The pinion gears and the void gear space for each set are divided into four distinct operating positions. When a front set gear or void gear space of a certain operating position meshes with the front rack gear (13), a rear set gear or void gear space of the same operating position will mesh with the rear rack gear (14) simultaneously, as illustrated in FIGS. 1 and 2. The steering shift lever (45) can shift the steering shaft (40) to any one of these four operating positions. Each operating position provides a distinct function or combination of functions, as following:

Position One: In Position One, the pinion gear-26 (26) meshes with the front steering rack gear (13) and the rear void gear space (35) engages the rear rack gear (14). The Position One will be used most often. The steering wheel (19) will steer only the front wheels (11), similar to most ordinary vehicles.

Figure 10:
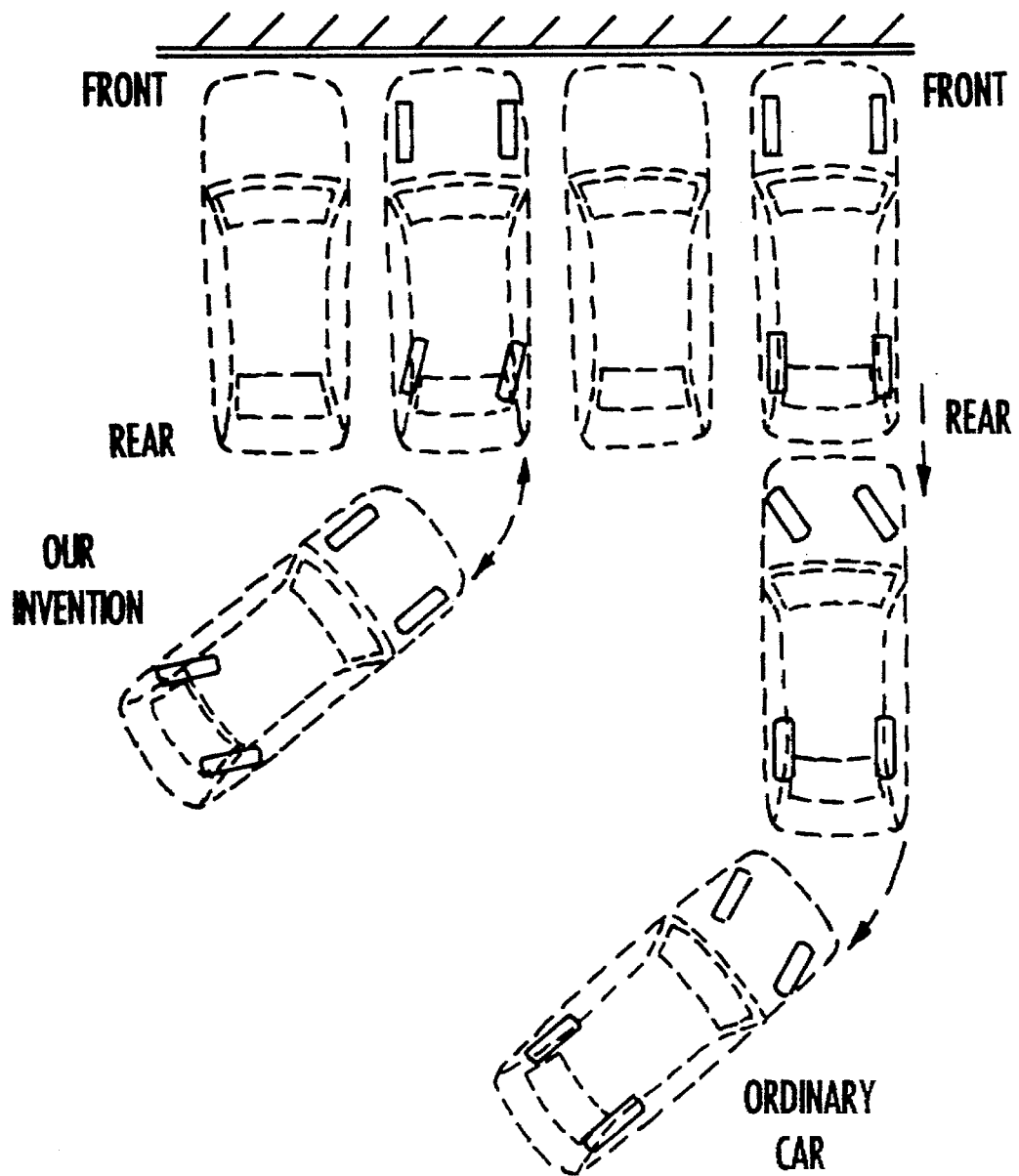
FIG. 10 is a schematic view of a vehicle equipped with a four-wheel steering system of this invention backing out of a parking slot under the Steering Mode Two, as compared with an ordinary vehicle backing out of an adjacent parking slot.

Position Two: In Position Two, there is a reverse idler gear (37) interposed between the pinion gear-36 (36) and the rear rack gear (14). The pinion gear-36 meshes with the reverse idler gear-37 and the reverse idler gear-37 further meshes with the rear rack gear (14). A front void gear space (25) engages the front rack gear (13). Thus, in Position Two, the font wheels (11) will not be steered by the steering wheel (19); the rear wheels (12) will be steered by the steering wheel to a direction opposite to the rotated direction of the steering wheel. It is preferred to steer the rear wheels (12) to the opposite direction so that the drivers do not need to change their customary direction of steering for backward driving. The Position Two will be utilized primarily when driving a vehicle backward. FIG. 10 illustrates the advantages of using Position Two when backing a vehicle out of a parking slot.

Position Three: In Position Three, the pinion gear-24 (24) of the front set meshes with the front rack gear (13) and, simultaneously, the pinion gear-34 (34) of the rear set meshes with the rear rack gear (14). Accordingly, the front wheels (11) and the rear wheels (12) will all be steered to a same direction with a same degree. Utilization of the Position Three will move the vehicle in obligue directions without any associated change of vehicle orientation. This steering method will be very useful in road-side parking and in maneuvering in very crowded areas. FIG. 11 shows the advantages of complete coincidence-phase direction steering.

Position Four: In Position Four, the pinion gear-22 (22) meshes with the front rack gear (13). There is a reverse idler gear-38 (38) interposed between the pinion gear-32 (32) and the rear rack gear (14). Thus, when the steering wheel (19)

is turned to one direction, the front wheels (11) will be turned to the same direction, and the rear wheels (12) will be turned to an opposite direction simultaneously. For example, if the front wheels are turned 30°degrees to the left, the rear wheels will be turned 30°degrees to the right, in reversephase direction. The Position Four will be very useful in U-turns and maneuvering in very crowded areas because it can provide very small turning radius.

The steering shaft (40) may include an optional fifth operating position which includes a void gear space to engage the front steering rack (20) and another void gear space to engage the rear steering rack (30). Function of the fifth operating position is to facilitate adjustment of wheel directions, detail to be described hereinafter.

For the worm gears-pitman arm shaft steering device, the foregoing teachings of this embodiment can be applied similarly. As shown in FIG. 3, a special worm shaft (50) is elongated to accommodate a front set worm gears (62, 64 and 66), including a front void gear space (65), and a rear set worm gears (72, 74 and 76), including a rear void gear space (75). The worm gears are associated with ball nuts. For simplicity, only two ball nuts (60, 70) are shown in FIG. 3. The ball nuts gears will mesh with gears on front and rear pitman arm shafts (61, 71) respectively. The front pitman arm shaft (61) is connected with front steering linkages (not shown in the figure )for front wheel steerage; and the rear pitman arm shaft (71) is connected with rear steering linkages (not shown in the figure) for rear wheel steerage. A steering shift lever (55) can be operated by the vehicle user to move the worm shaft (50) to a plurality of distinct operating positions. Each set of the worm gears is disposed on the worm shaft (50) in four operating positions, similar to the foregoing teachings. There is a reverse idler gear (77) for the Position Two and another reverse idler gear (78) for the Position Four. The function or combination of functions of each operating position are the same as the foregoing teachings.

Since one steering wheel is used to turn both the front wheel steering device and the rear wheel steering device, it is preferred to use powered steering systems to decrease the turning effort. This can be done in a way similar to the conventional powered steering setups.

The disposition of the two sets of pinion gears and the void gear spaces is illustrated in FIG. 2. The operating positions and the steering modes are summarized in the Table One and Table Two as following:

TABLE ONE

The pinion gears for each "Position":
There are two sets of pinion gears.
The first set of pinion gears will mesh with the gear on the front wheel steering rack.
The second set of pinion gears, two with reverse idlers, will mesh with the gear on the rear wheel steering rack.

|  | To mesh with the gear on the front wheel steering rack | To mesh with the gear on the rear wheel steering rack |
| --- | --- | --- |
| Position One | Pinion gear | Empty (No pinion gear |
| Position Two | Empty (No pinion gear) | Pinion gear and reverse idler |
| Position Three | Pinion gear | Pinion gear |
| Position Four | Pinion gear | Pinion gear and Reverse Idler |

Thus, for the first embodiment, each specific operating position on the steering shaft correlates to each specific steering mode. When the steering pinion shaft is shifted to Position One, the vehicle will be steered under the Steering Mode One. When the steering shaft is shifted to Position Two, the vehicle will be steered under the Steering Mode Two; and so forth. Their specific functions are summarized in Table Two as follows.

TABLE TWO

| Steering Modes | Steering Shaft Positions | Functions |
| --- | --- | --- |
| One | Position One | Regular steering of front wheels |
| Two | Position Two | Steering of rear wheels |
| Three | Position Three | Steering of front wheels and rear wheels at the coincidence-phase direction |
| Four | Position Four | Steering of front wheels and rear wheels at the reverse-phase direction |

It should be noted that other designs may be utilized to turn the rear wheels to a direction opposite to the rotated direction of the steering wheel, without using the foregoing two reverse idler gears (37, 38). For example, the rear steering linkages (16) can be modified such that the rear wheels are turned to a direction opposite to the turning direction of the steering wheel. However, with this reversed rear steering linkages design, at least one reverse idler gear will be still needed such that the system can provide Steering Mode Three to turn the rear wheels in the same direction as the front wheels.

For Steering Mode Four, there is a summation of the yawing effects from the front wheels and the rear wheels because they are turned to reverse-phase directions. Thus it is preferred to have a mechanism to reduce the steering efficiency in half. This can be done in a few different ways. For example, accessory gears (not shown in the figures) may be interposed between the pinion gear-22 (22) and the front rack gear (13) such that the steering efficiency for the front wheels is reduced by 50%; meanwhile, the number of teeth on the reverse idler gear-38 (38) can be adjusted such that the steering efficiency for the rear wheels is also reduced by 50%. The summation of the yawing effect from the front wheels and the yawing effect from the rear wheels will be equal to 100%. Accordingly the steering efficiency and steering effort for the Steering Mode Four will be essentially the same as those of Steering Mode One and Steering Mode Two. Thus the reverse-phase steering will be more comfortable and predictable for the drivers. This advantage is not available in any of the prior art inventions.

The foregoing concept of this embodiment, including an elongated steering shaft carrying a plurality of gears, can be modified to become more compatible with most prior art inventions. Most prior art inventions utilize a traditional mechanical steerage for front wheels and electronic indirect steerage for the rear wheels. However, these prior art four-wheel steering systems can not provide all of the advantages of the present invention because the prior art front wheel steerage can not be changed to any other mode.

An obvious modification of this first embodiment is to combine the novel concepts and designs of this invention with the prior art designs such that the front wheels are steered by the novel mechanical steering design as the foregoing teachings and the rear wheels are steered indirectly by an electronic design.

Figure 4:
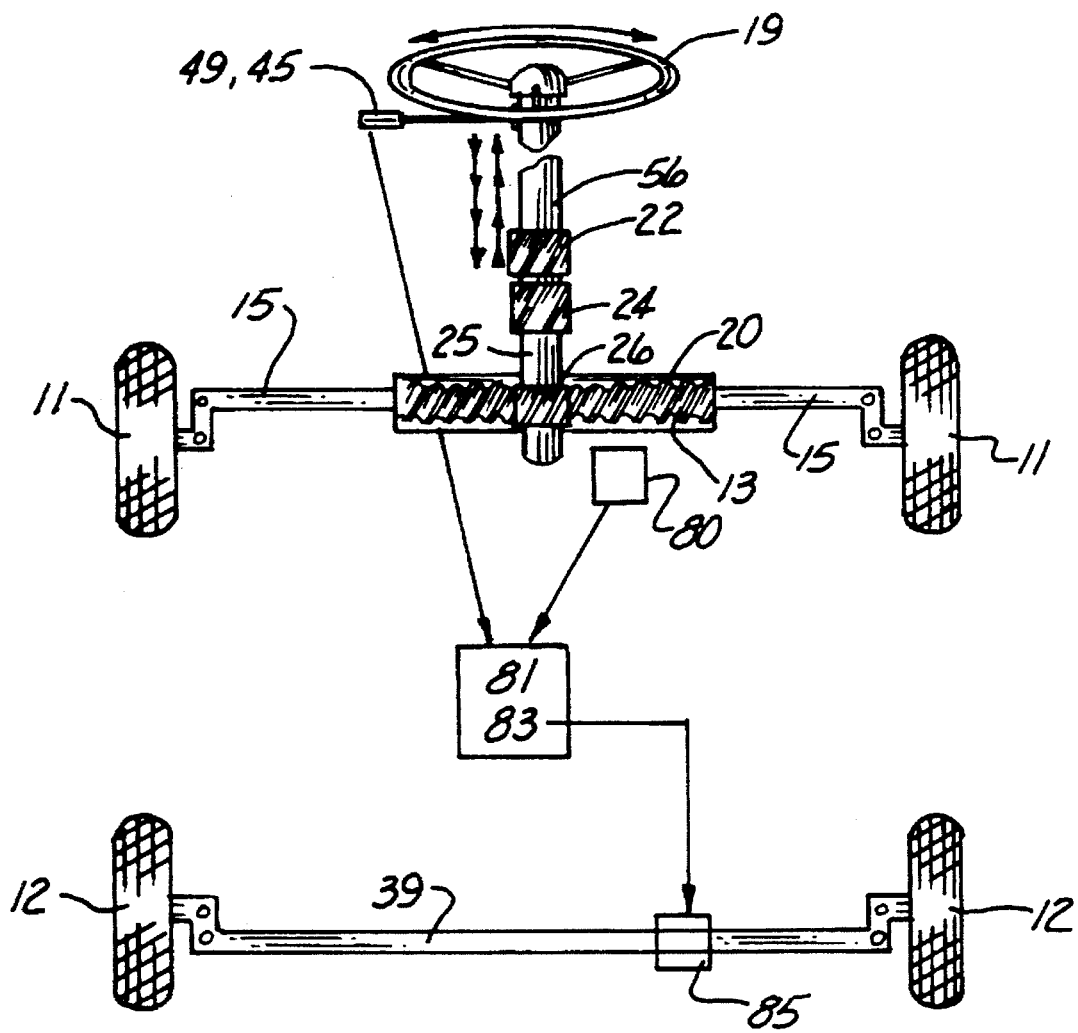
FIG. 4 is a schematic drawing illustrating a modified design of the first embodiment of this invention, wherein the front wheels are under mechanical control and the rear wheels are under electronic control.
Figure 5:
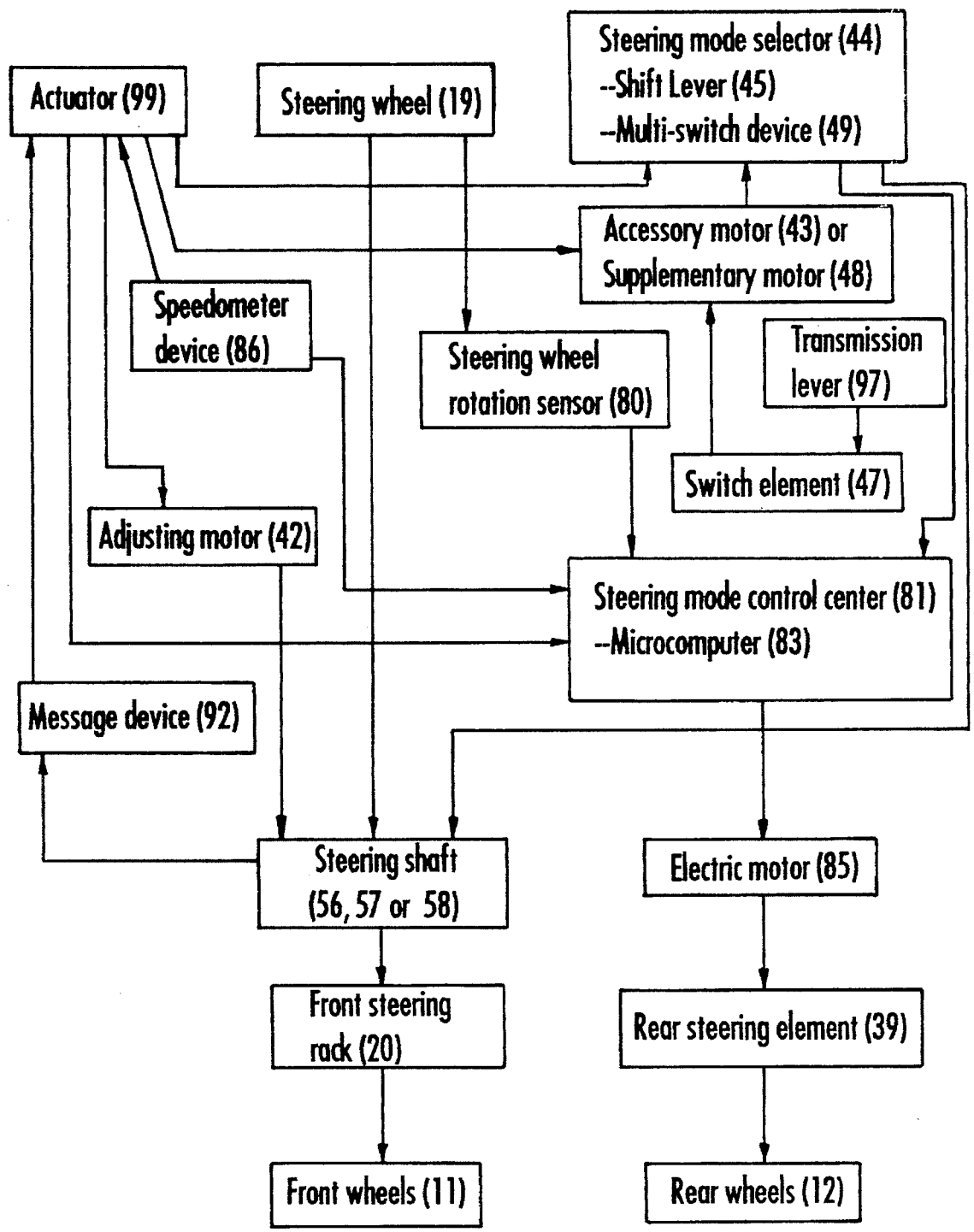
FIG. 5 is a flowchart demonstrating a specific operation of the electronic control sequence for the steering system in the modified design of the first embodiment.

In this modified design, as illustrated in FIGS. 4, 5, the front wheels (11) is controlled by a front steering rack (20)

which is functionally connected to a partially elongated steering shaft (56); the turning of the rear wheels (12) is controlled by a steering element (39) which is controlled by an electric motor (85). The electric motor (85) is controlled by a microcomputer (83) which receives input signals from a steering wheel rotation sensor (80) and a steering mode selector (44). This partially elongated steering shaft (56) carries the front set pinion gears (22, 24, 26) and a void gear space (25) divided into four distinct operating positions. The rear set pinion gears is not needed in this modified design. The steering shift lever (45), which is a component of the steering mode selector (44), can be operated by the vehicle user to select the steering modes for the front wheels (11).

The rear wheel steering element (39) can be moved by the electric motor (85). The steering wheel rotation sensor (80) detects the degree and direction of rotation of the steering wheel (19), including its rotation speed and rotation acceleration, and convert these data into electronic signals. These signals are sent to a steering mode control center (81), which comprises a microcomputer (83). The microcomputer processes the input signals and send output signals to the electric motor (85) which can move the rear wheel steering element (39). The microcomputer (83) also receives input signals from the steering mode selector (44) which includes another component, a multi-switch device (49) or a selection buttons device (46). The multi-switch device (49) and the steering shift lever (45) are integrated such that they will select the same steering mode for rear wheels (12) and front wheels (11) respectively. This integrating mechanism can be designed in a way that for every shift lever (45) position there is a correlated switch component. When the shift lever (45) is placed at a specific position by the driver, the correlated switch component of the multi-switch device (49) will be automatically activated. The microcomputer (83) processes the signals from both the steering mode selector (44) and the steering wheel rotation sensor (80) and then produce output signals in accordance with the function of each selected steering mode. These output signals can control the electric motor (85) to control the rear steering element (39). Thus the driver can operate this integrated shift lever and multi-switch device to select a steering mode for the front wheels and rear wheels simultaneously.

As an optional design, for the Steering Mode Four, preferably the steering efficiency can be reduced by 50% for both the front wheel steerage and rear wheel steerage. For the front wheels, this can be done by an accessory gear as the foregoing teachings. For the rear wheels, the reduction of steering efficiency can be done easily by simply reducing the electronic output signals from the microcomputer (83) by 50% when the Steering Mode Four is utilized.

Figure 6:
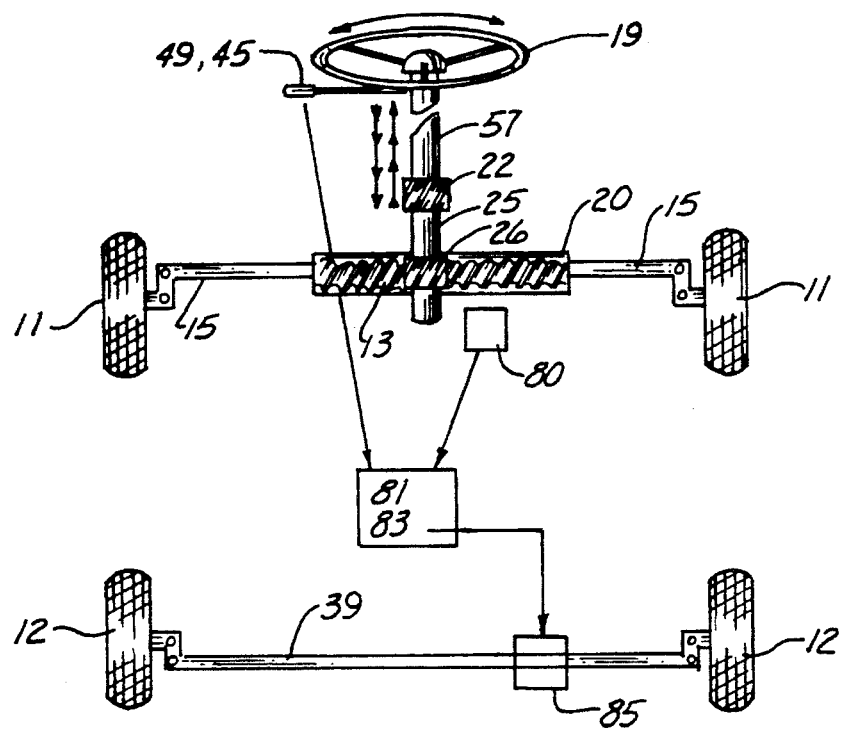
FIG. 6 is a schematic drawing illustrating another modified design of the first embodiment with decreased number of pinion gears on the pinion shaft.

FIG. 6 illustrates another modified design of the first embodiment, wherein there is only three pinion gear positions on another partially elongated pinion shaft (57). The pinion gear-26 (26) will be used for both "Position One" and "Position Three". Thus pinion gear-26 provides the Steering Mode One and Steering Mode Three functions for the front wheels. There is no change for Position Two and Position Four. The Position Two has the void gear space-25 (25) and the Position Four includes the pinion gear-22 (22) and an accessory gear to decrease the steering efficiency by 50%. The rear wheel steerage is the same as the modified design illustrated in FIGS. 4 and 5.

Figure 7:
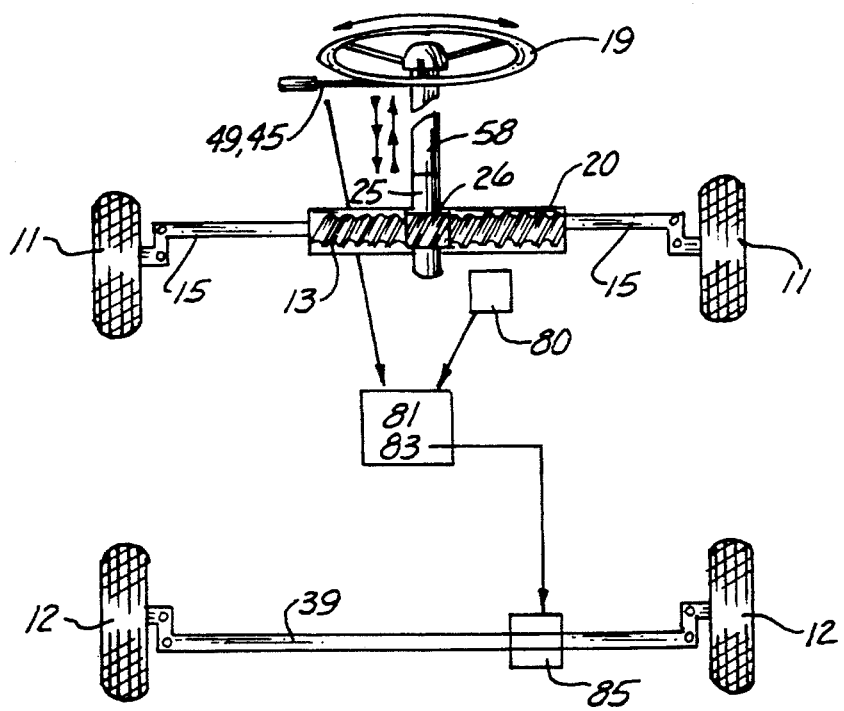
FIG. 7 is a schematic drawing illustrating a further modified design of the first embodiment having only one pinion gear and one void gear space on the pinion shaft.

A further simplified aspect of the first embodiment, as illustrated in FIG. 7, includes only the pinion gear-26 (26) and the void gear space-25 (25) on a simplified steering shaft .(58). The single pinion gear-26 will be used for the Positions One, Three and Four functions. The void gear space-25 (25) will be used for Position Two. Thus the pinion gear-26 will provide Steering Modes One, Three and Four functions for the front wheels (11); and the void gear space-25 will provide the function of no steerage of front wheels to fit the Steering Mode Two. Under this further simplified aspect, the steering efficiency of the front wheels can not be reduced for Steering Mode Four.

For vehicles with hydraulic steering system for rear wheels, the output signals from the microcomputer (83) will be sent to a hydraulic pressure controller to effect rear wheel steerage, similar to the foregoing teachings.

The advantages of the four steering mode system in this invention can be best utilized during relatively slow vehicle speeds in very crowded spaces. However, it should be understood that the microcomputer (83) may receive and process other input variables, as disclosed in prior art four-wheel steering systems to modify the steering modes, especially during relatively high vehicle speed. For example these other input variables may include signals from a speedometer device, a wheel-locking detector or a vehicle centrifugal force detector. When the microcomputer (83) receives signals from a speedometer device (86), the rear wheel steerage can be modified according to the vehicle speed and acceleration. Accordingly, the advantages of reduced lateral wheel skidding during cornering, increased vehicle stability, and other advantages of prior art four-wheel steering systems can be incorporated into the present invention.

This embodiment includes a safety auxiliary design to prevent any inadvertent change of the steering modes. This safety design includes an actuator (99) to regulate the steering mode selection. The actuator includes electronic devices with memory chips and processing chips. The actuator (99) is operable by the vehicle user as another control center to achieve the following three gate-keeper type functions to promote safety and smooth operation, as shown in FIG. 5.

The first function of the actuator (99) is to prevent any inadvertent push on the steering mode selector or the shift lever (45). A button on the actuator should be pushed simultaneously when the steering mode selector is utilized to change the steering mode.

The second function of the actuator (99) is that it can prevent any steering mode change when a vehicle is moving. This is an optional design. With input signals from the speedometer device (86) to the actuator (99), the driver's push on the actuator will be rendered ineffective when the vehicle is moving.

The third function of the actuator (99) is that it will coordinate all wheels being adjusted to a neutral direction before any change of the steering mode. For this invention to function properly, the rear wheels should be at a neutral direction when the driver is using front wheel steerage; and the front wheels should be at the neutral direction when the driver is using rear wheel steerage. There are four different designs for wheel adjusting to achieve the third function of the actuator (99), as following:

The first design for wheel adjusting, as shown in FIG. 5, includes an adjusting motor (42) functionally attached to the steering wheel (19) or the steering shaft (40) or the modified steering shaft (56, 57 or 58). The adjusting motor is controlled by the actuator (99). The driver can activate the adjusting motor (42) to rotate the steering shaft (40) to turn all wheels to the neutral direction, or to rotate the modified steering shaft (56, 57 or 58) to turn the front wheels to the neutral direction. This can be done only when the vehicle is not moving. Thus steering mode change requires seriate operations of the actuator (99). A first push on the actuator (99) will move the wheels to the neutral direction. After that, the driver can proceed with a second push on the actuator (99). The second push on the actuator (99), when done simultaneously with operating of the shift lever (45), will make the shift lever operable for steering mode change. In a simplified version of the first design, which is suitable for slow simple vehicles, the adjusting motor (42) is replaced by the driver's manual rotating on the steering wheel (19) to do the wheel adjusting. An optional message device (92) may be used to help to guide the driver. The message device (92) is functionally associated with the steering shaft (40) or the modified steering shaft (56, 57 or 58) such that, during the operating of steering mode change, an audible or visible message is produced when the steering wheel (19) is rotated by the driver to the neutral direction. The message device (92) then sends a signal to the actuator (99) to allow the actuator (99) to be operable for steering mode change.

The second wheel adjusting design includes an accessory electric motor (43), a front aligning motor (17) and a rear aligning motor (18), as in FIG. 1, all being controlled by the actuator. The accessory motor (43) is functionally attached to the shift lever (45) or the steering shaft (40) such that the steering shaft can be moved to a specific operating position when the accessory motor is activated by the actuator (99). The front aligning motor (17) is functionally attached to the front steering rack (20) and the rear aligning motor (18) is functionally attached to the rear steering rack (30) such that the front and rear aligning motors can align the front and rear wheels (11, 12) to the neutral direction respectively when activated by the actuator (99). The actuator has seriate functions. Thus with the first push on the actuator, the accessory motor (43) will automatically displace the steering shaft (40) to the Steering Mode Two position whereupon the front aligning motor (17) can turn the front wheels (11) to the neutral direction, and thereafter or thertofore, the accessory motor will automatically displace the steering shaft to the Steering Mode One position whereupon the rear adjusting motor (18) can turn the rear wheels (12) to the neutral direction.

In a third wheel adjusting design, the steering shaft (40) includes an optional fifth operating position, as shown in FIG. 1, wherein a front void gear space (21) engages the front steering rack (20) and a rear void gear space (31) engages the rear steering rack (30). With the first push on the actuator (99), the accessory motor (43) will displace the steering shaft (40) to the fifth operating position, whereupon the front aligning motor (17) will move the front steering rack (20) to align the front wheels (11) to the neutral direction, and the rear aligning motor (18) will move the rear steering rack (30) to align the rear wheels (12) to the neutral direction. Similar to the foregoing teachings, the front and rear aligning motors (17, 18) may be substituted with hydraulic pressure controllers. The second and the third wheel adjusting designs may be similarly applied to the modified steering shafts (56, 57 or 58) to align the front wheels.

A fourth wheel adjusting design is applicable for the electronic type of steering systems for the rear wheels, in the modified designs for the first embodiment. This fourth wheel adjusting design, as in FIG. 5, utilizes the pre-existing microcomputer (83) and the electric motor (85) or a hydraulic pressure controller. An electric circuit connects the actuator (99) and the microcomputer (83). An initial activation of the actuator (99) will send signals to the microcomputer (83) which will process the signals and send output signals to the electric motor (85) to align the rear wheels (12) to the neutral direction.

This invention further includes an optional auxiliary design to promote the driver's convenience during backward driving. Since the Steering Mode Two is primarily used in backward driving, the driver's convenience will be improved by coupling the backward driving and the Steering Mode Two together. This coupling design will automatically make the steering mode selector pick the Steering Mode Two whenever the driver shifts the transmission gear to a reverse gear.

There are many different designs for the foregoing coupling function. As shown in FIG. 5, a coupling design has a supplementary electric motor (48) attached to the shift lever (45). The supplementary motor (48) is connected with a circuit from a reverse transmission gear. The supplementary motor (48) may be the same as the accessory motor (43). A switch element (47) is functionally correlated with a transmission lever (97) being in a reverse gear position. This switch element (47) will be activated automatically when the driver shifts the transmission lever to the reverse gear position. A circuit connects the switch element (47) and the supplementary motor (48). Accordingly, when the driver engages the reverse transmission gear, this circuit will send a signal to the supplementary motor (48) which can automatically move the shift lever (45) or the integrated shift lever(45)-multi-switch device (49) to the Steering Mode Two position.

It should be noted that in the modified designs of the first embodiment, the function of the front void gear space (25) can be substituted by temporary dissociation between the steering shaft (56, 57 or 58) and the front rack gear (13). This substitution design includes the joint structure (93) being movable by the accessory motor (43) such that the steering shaft (56, 57 or 58) can be temporarily disengaged from the front rack gear (13). This substitution is also applicable to the fifth operating position.

The Second Preferred Embodiment

Figure 8:
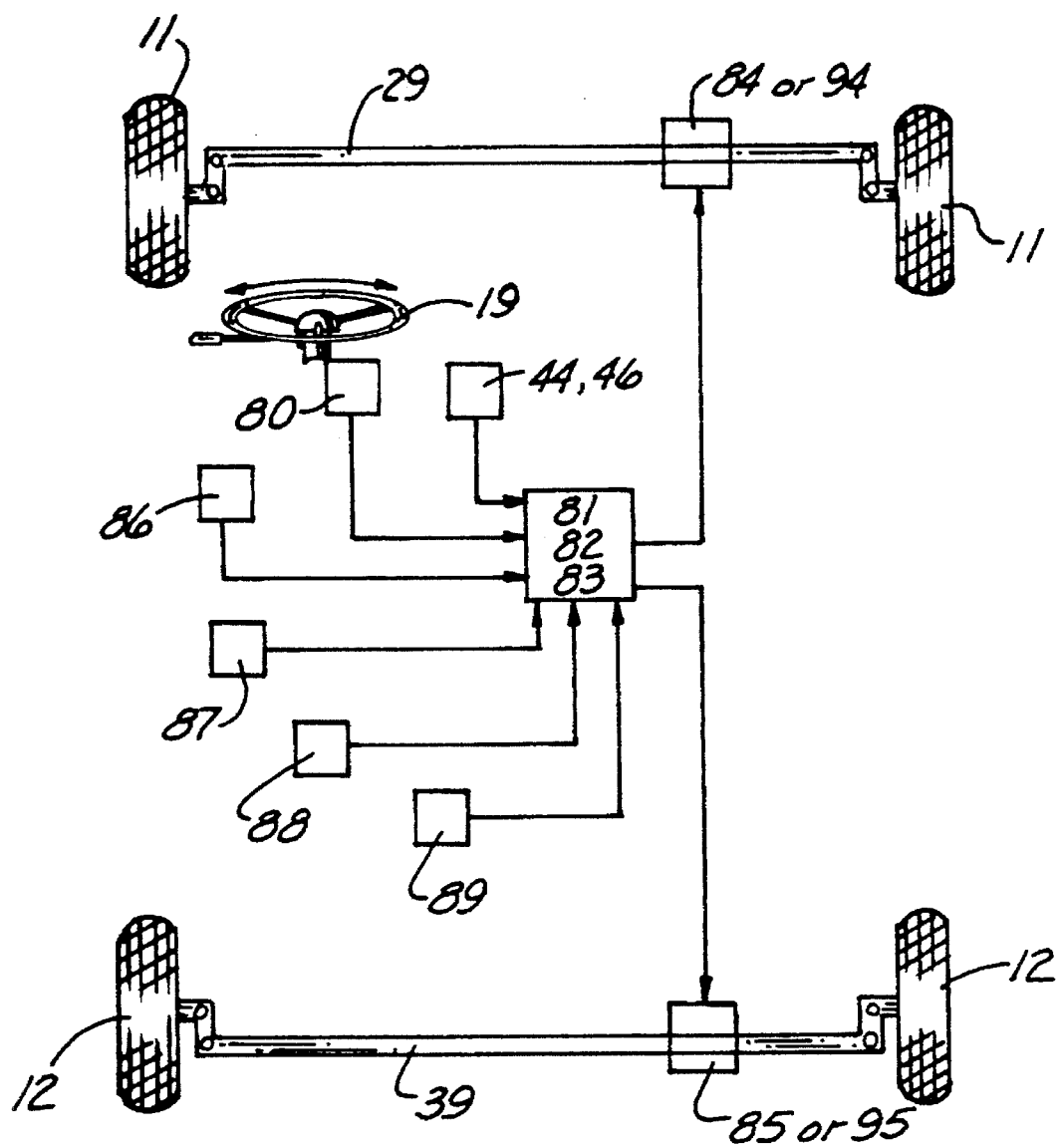
FIG. 8 is a schematic drawing illustrating the second preferred embodiment of this invention, with choices of multiple steering modes, having the front wheels and rear wheels under electronic control.
Figure 9:
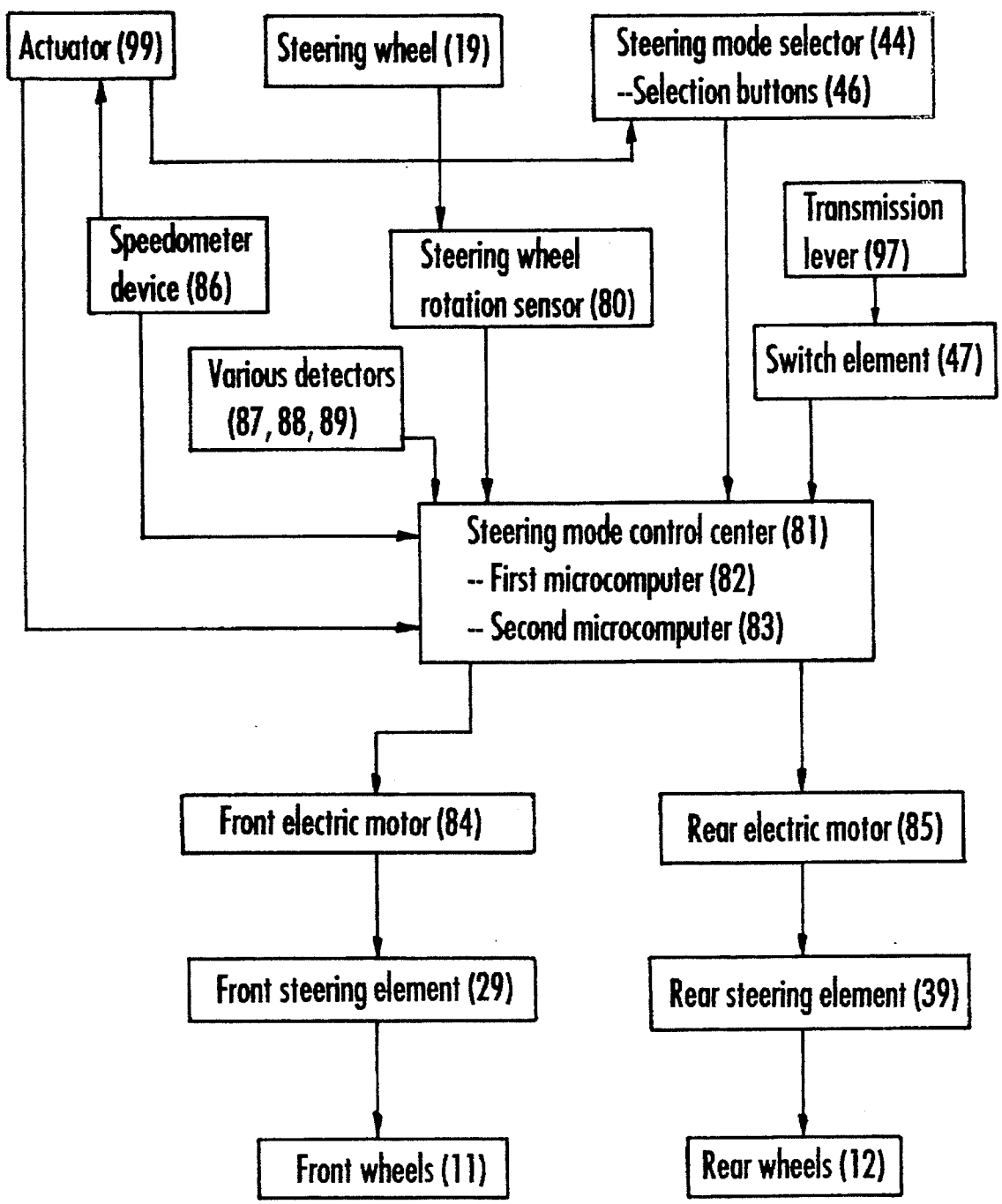
FIG. 9 is a flowchart demonstrating a specific operation of the electronic control sequence for the second embodiment.

In the second embodiment, as illustrated in FIGS. 8 and 9, the direction of the front wheels (11) is controlled by a front steering element (29) and the direction of the rear wheels (12) is controlled by a rear steering element (39). The front and rear steering elements (29, 39) are connected with the front and rear wheels (11, 12) and are controlled by electric motors (84, 85) respectively. These electric motors (84, 85) are controlled by two microcomputers (82,83) which receive input signals from a steering wheel rotation sensor (80) and a steering mode selector (44). The two microcomputers (82, 83) may be combined into a signal computer device, as a steering mode control center (81).

The second embodiment is also a novel design because there is no prior art invention which uses complete electronic control for both front wheels and rear wheels. The front and rear steering elements (29, 39) are indirectly controlled by a steering wheel (19) through electronic signals generated by the steering wheel rotation sensor (80) which detects the direction, degree, speed and acceleration of rotation of the steering wheel. There is no direct mechanical connection between the steering wheel (19) and the front wheels (11) or the rear wheels (12). The steering wheel rotation sensor (80) can convert the received input signals into output electronic signals which are sent to the steering mode control center (81). The steering mode control center (81) includes the first microcomputer (82) and the second microcomputer (83), both capable of processing the received signals and sending output signals to control the front and rear electric motors (84, 85) respectively.

For the second embodiment, the steering mode selector (44) may be a selection-buttons device (46), conveniently located for the driver to operate. Four steering modes are utilized in the second embodiment, similar to the first embodiment.

For Steering Mode Four, the steering efficiency can be reduced by 50% by simply reducing the electronic signals from the first and the second microcomputers (82, 83) by 50% when Steering Mode Four is utilized.

The advantages of the second embodiment is that it is very versatile and simple. It can easily accommodate the aforementioned advantages of the first preferred embodiment of this invention. It can further accommodate the advantages of most prior art four-wheel steering systems because the microcomputers (82, 83) of the second embodiment can easily incorporate other modifying parameters. The microcomputers (82, 83) may receive and process input signals from various other sensors or detectors, including a speedometer (86), a wheel locking detector (87), a vehicle body tilting detector (88) or a wheel skidding detector (89). The microcomputers (82, 83) may utilize these input signals, representing vehicle speed or acceleration, wheel locking, vehicle body tilting and wheel skidding to modify the output signals from the microcomputers and thus to adjust either the front wheel steerage or the rear wheel steerage or both to improve the quality and safety of vehicle steering.

A disadvantage of the second preferred embodiment is that damage or malfunctioning of electronic devices could make the vehicle unsteerable. To prevent this type of disadvantage, it is preferred to have at least a duplicate electronic system and appropriate warning system. By using high quality electronic devices, this disadvantage can be prevented.

Similar to the first embodiment, the second embodiment further includes the actuator (99) functions, the wheel adjusting function and the coupling function. The designs for the actuator (99) and the wheel adjusting device are similar to the foregoing teachings for the rear wheels in the modified designs for the first embodiment, except that these teachings should be applied to the front wheels (11) and the rear wheels (12). The coupling device will automatically select the Steering Mode Two when the driver engages a reverse transmission gear. The coupling design for the second embodiment includes connecting the switch element (47) to the microcomputers (82, 83) via circuits. Thus, when the driver engages the reverse transmission gear, the switch element (47) will send signals to the microcomputers (82, 83) to automatically utilize the Steering Mode Two.

It should be noted that the front electric motor (84) and the rear electric motor (85) may be replaced by a front hydraulic pressure controller (94) and a rear hydraulic pressure controller (95) for vehicles which use hydraulic systems in their steering designs.

Figure 12:
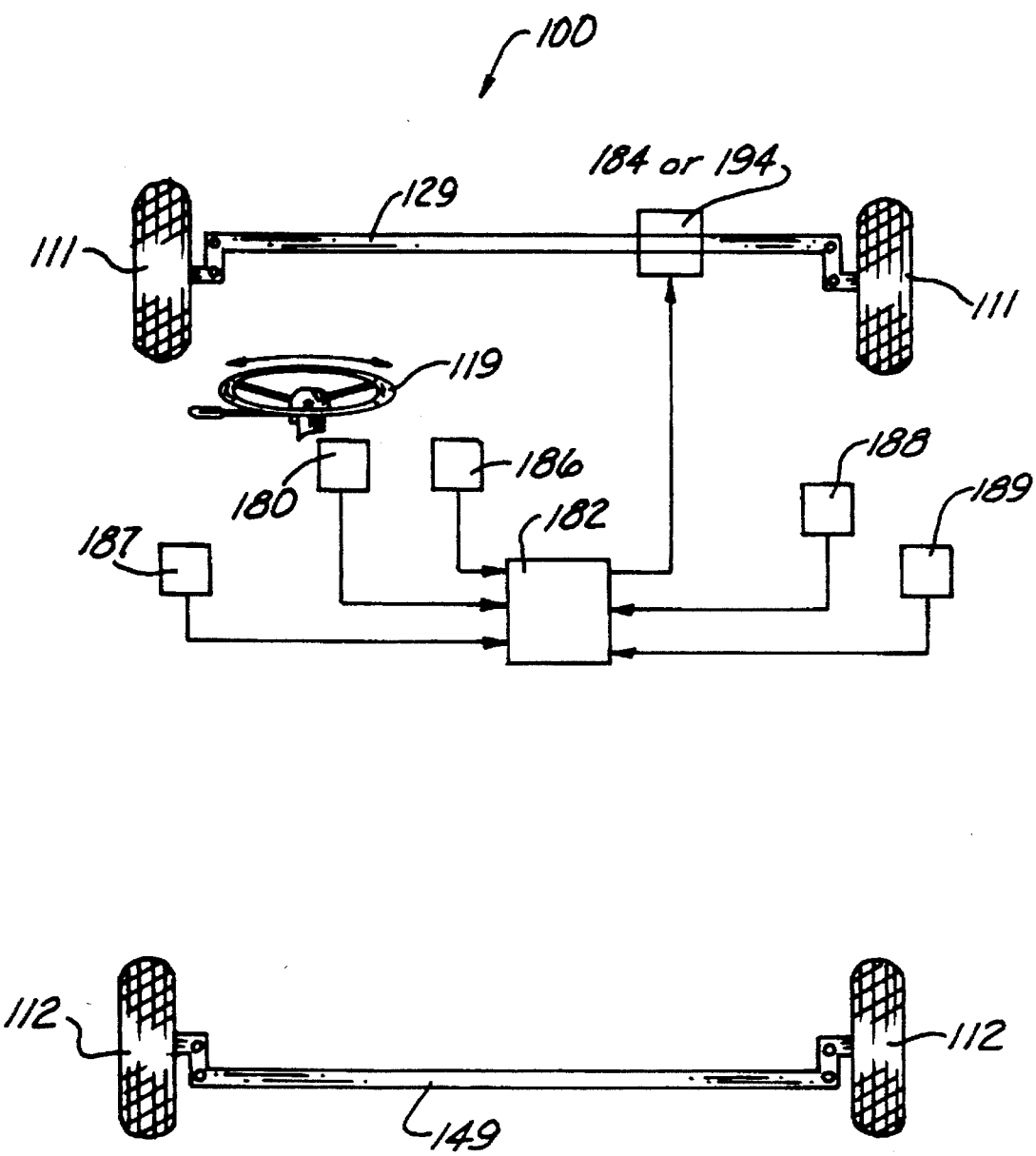
FIG. 12 is a schematic drawing illustrating a modified aspect of the second preferred embodiment, with indirect steerage for a front-wheels-steering vehicle.
Figure 13:
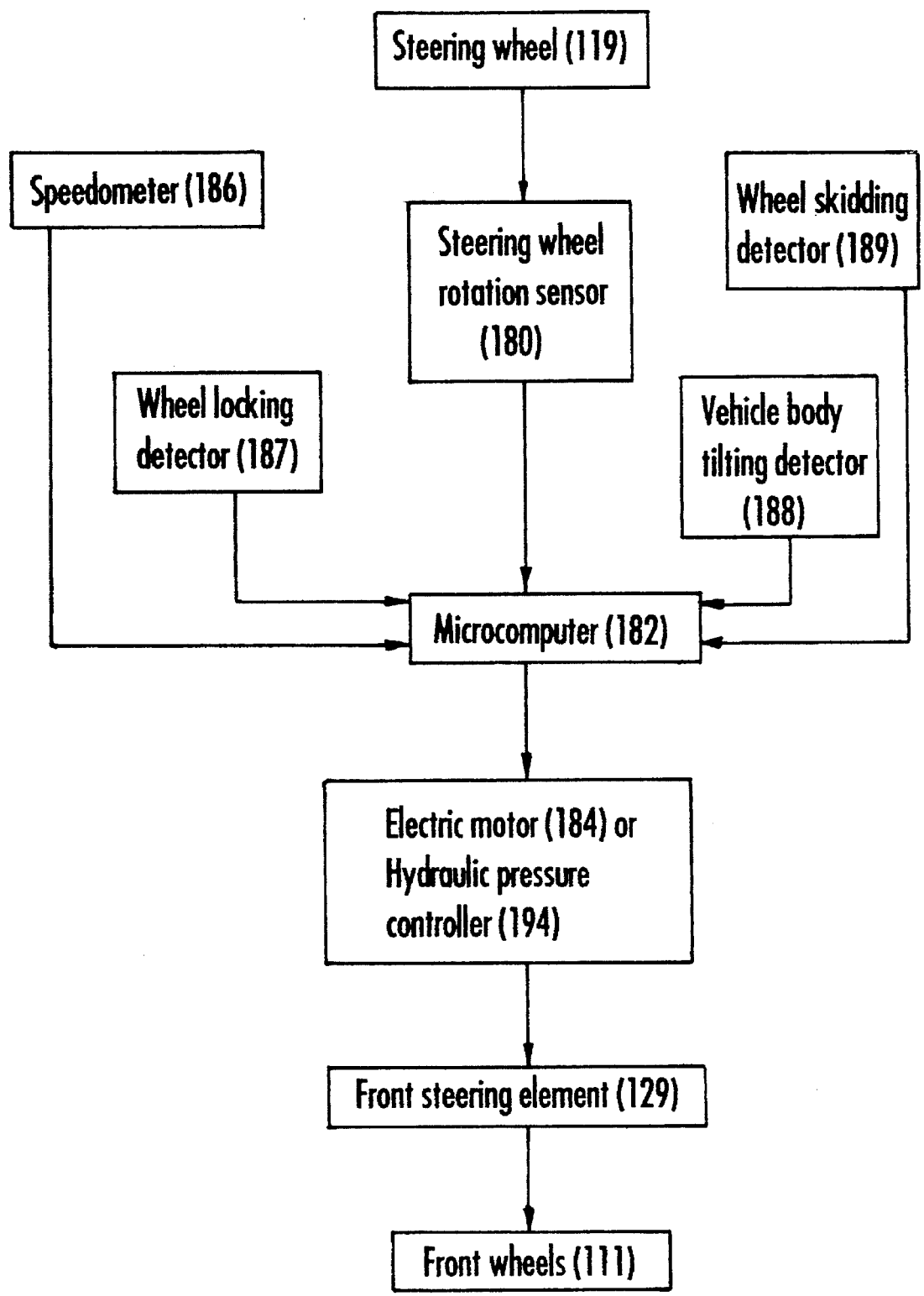
FIG. 13 is a flow chart demonstrating a specific operation of the electronic control sequence for the modified aspect of the second preferred embodiment.

The indirect steerage concept of this second preferred embodiment can be utilized in front-wheels-steering vehicles. In this modified aspect of the second preferred embodiment, as illustrated in FIGS. 12 and 13, a vehicle (100) is equipped with indirectly steerable front wheels (111), nonsteerable rear wheels (112), a steering wheel (119) and a microcomputer (182). The direction of the front wheels (111) is controlled by a front steering element (129). The rear wheels (112) are connected with a rear wheel supporting structure (149) which is not associated with any steerable element. The front wheel steering element (129) is functionally connected and controlled by an electric motor (184) or a hydraulic pressure controller (194). The electric motor (184) or the hydraulic pressure controller (194) is functionally connected and controlled by the microcomputer (182). A steering wheel rotation sensor (180) is functionally connected with the steering wheel (119). The steering wheel rotation sensor (180) is capable of sensing the steering wheel (119) rotation and sending electronic signals representing steering wheel rotation to the microcomputer (182). With the input signals from the steering wheel rotation sensor (180), the microcomputer (182) can send output signals to the electric motor (184) or the hydraulic pressure controller (194) to control the front wheel steerage.

The foregoing novel indirect steerage design for the front wheels (111) offers significant advantages over traditional direct front wheel steerage designs. Various modifying parameters, such as the steering wheel rotating speed or steering wheel rotating acceleration, can be incorporated into the microcomputer (182) to modify the front wheel steerage. Furthermore, the microcomputer (182) may receive other input signals to modify the front wheel steering. For example, the microcomputer (182) may receive input signals from a speedometer (186), a wheel locking detector (187), a vehicle body tilting detector (188), or a wheel skidding detector (189) such that the vehicle steerage can be modified by the vehicle speed or acceleration, wheel locking, vehicle body tilting or wheel skidding.

It is well known in the art that adjusting vehicle steering according to vehicle speed, acceleration, wheel locking, vehicle body tilting or wheel skidding can improve quality of steering control, improve vehicle stability and decrease accidents. An example of a wheel skidding detecting system is disclosed in U.S. Pat. 5,314,037, granted on May 24, 1994 to us and in our pending U.S. patent application Ser. No. 08/147,312, filed on Nov. 5, 1993.

Similarly, a speedometer, a wheel locking detector, a vehicle body tilting detector or a wheel skidding detector can be utilized in the indirect steerage design for the rear wheels in the modified aspects of the first preferred embodiment of this invention to have all of the aforementioned advantages.

It should also be understood that, as an alternative design, the coupling function in both the first and the second preferred embodiments may be designed in a reverse fashion such that when the driver engages the Steering Mode Two, the transmission lever will be automatically shifted to the reverse transmission gear position. This alternative design is illustrated in FIG. 14 and FIG. 15.

Figure 14:
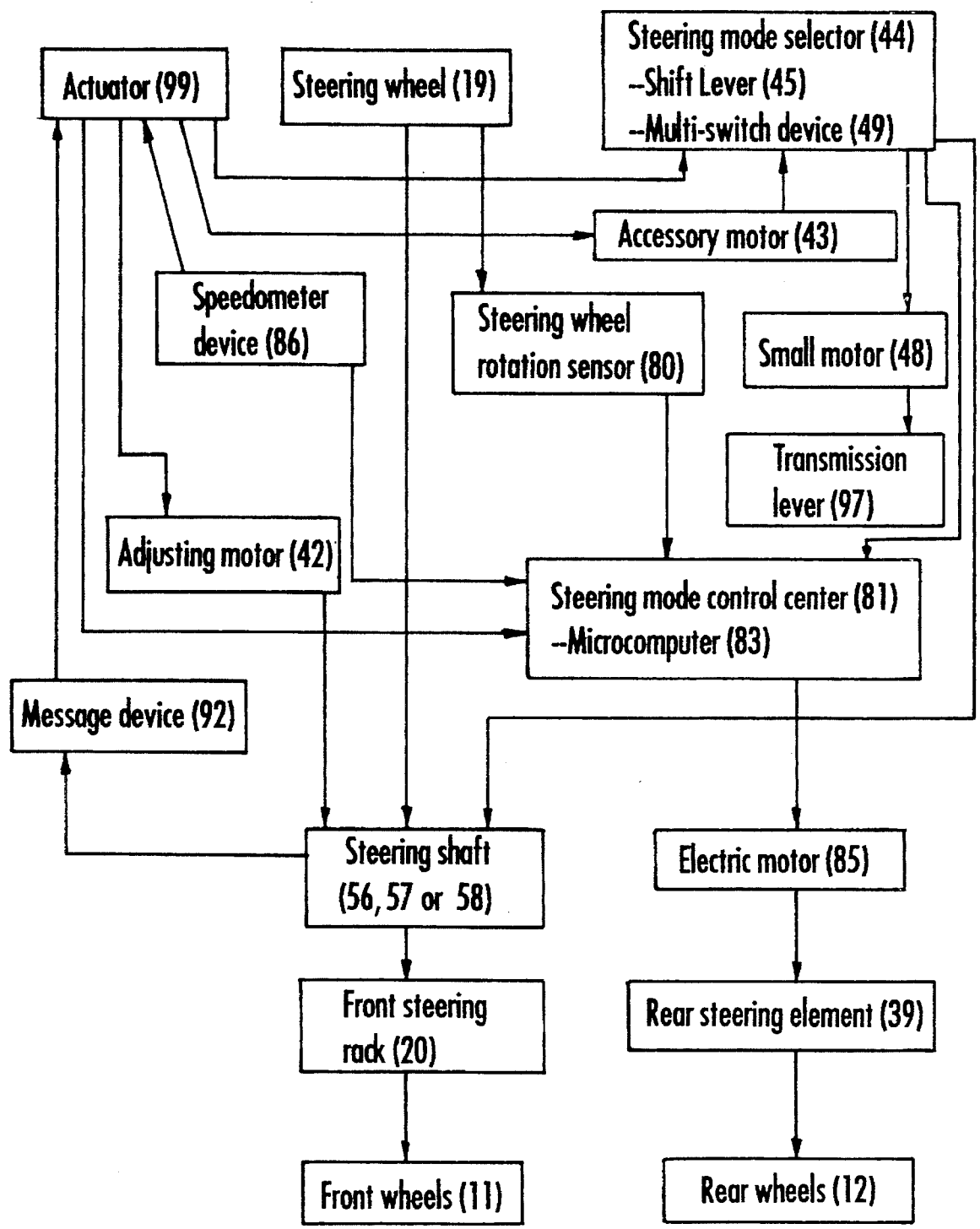
FIG. 14 is a flowchart demonstrating a specific operation of the electronic control sequence for the steering system in an alternative design for the modified aspect of the first preferred embodiment.

In FIG. 14, for the first embodiment, a small motor (49), when activated, can move the transmission lever (97) to the reverse transmission gear position. The steering mode selector (44) has a circuit to the small motor (49) such that when the driver engages the Steering Mode Two, the small motor will be automatically activated to move the transmission lever (97) to the reverse transmission gear position.

Figure 15:
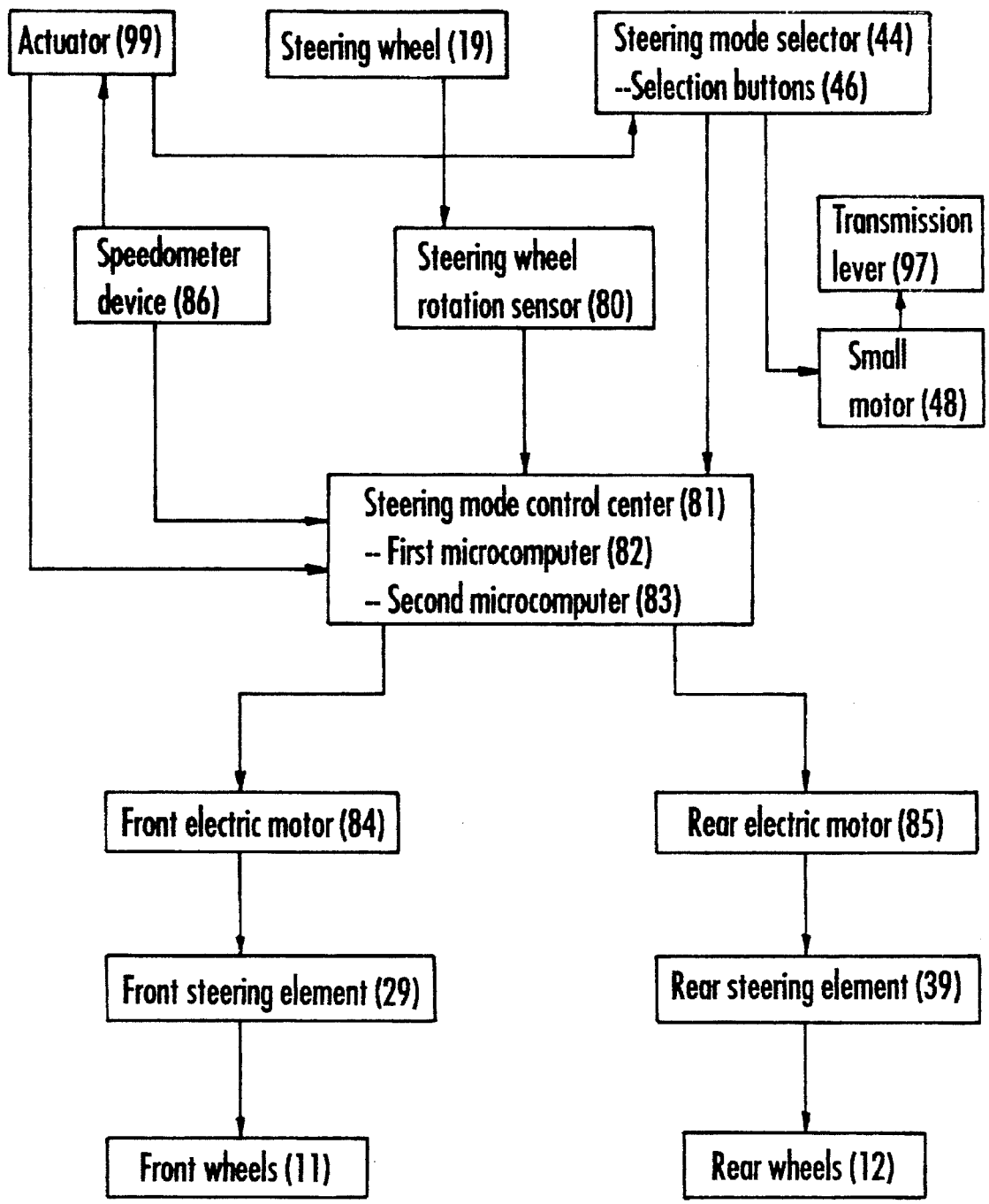
FIG. 15 is a flowchart demonstrating a specific operation of the electronic control sequence for an alternative design of the second preferred embodiment.

Similarly, in FIG. 15, for the second embodiment, a small motor (49), when activated, can move the transmission lever (97) to the reverse transmission gear position. The steering mode selector (44) is connected with the small motor (49) such that engagement of the Steering mode Two by the driver will automatically activate the small motor to move the transmission lever (97) to the reverse transmission gear position.

Similar concept may be used such that when the driver engages the Steering Mode One, the transmission is set at a regular forward transmission gear automatically.

This invention is applicable to various types of vehicles, including automobiles, trucks, fork lift trucks, mobile cranes and other passenger or industrial vehicles.

Having thereby described the subject matter of the present invention, it should be apparent to those skilled in the art that many substitutions, modifications and variations are possible in light of the above teachings. It is therefore to be understood that the proper scope of the present invention should be determined by the broadest interpretation of the appended claims so as to encompass all such modifications and equivalents.

We claim:

1. A steering system for a vehicle having front wheels and rear wheels, said steering system comprising:

a rotatable steering wheel;

a selectable steering mode selector means for providing a specific choice among a plurality of distinct steering modes and generating signals thereof;

a steering wheel rotation sensor means for sensing rotation of the steering wheel and generating signals thereof;

a front drive means operably connected with the front wheels for controlling the direction of the front wheels;

a shaft means for carrying the front drive means for controlling the direction of the front wheels, said shaft means being operably attached to and controlled by both the steering wheel and the steering mode selector means; a plurality of gear positions being specifically disposed on the shaft means; the gear positions including at least a filled gear position and at least an empty gear position; each filled gear position including at least a gear; each empty gear position including no gear; a selected one of the gear positions being disposed to selectively engage the front drive means; the steering mode selector means being operable to control which gear position engages the front drive means;

a microcomputer means for receiving and processing signals from both the steering wheel rotation sensor means and the steering mode selector means and generating output signals thereof; and a rear steerage executing means operably connected with the rear wheels for controlling the direction of the rear wheels; said rear steerage executing means being controlled by the output signals from the microcomputer means.

2. The steering system of claim 1, wherein the rear steerage executing means includes at least one of an electric motor and a hydraulic pressure controller.

3. The steering system of claim 1, wherein the shaft means includes a modified pinion shaft; the gear includes a pinion gear; and the front drive means includes a front steering rack.

4. The steering system of claim 1, wherein the shaft means includes a modified worm shaft; the gear includes a worm gear; and the front drive means includes a front pitman arm shaft.

5. The steering system of claim 1, wherein the shaft means includes a plurality of distinct operating positions, each operating position being correlated with a selected one of the gear positions; each operating position being correlated with at least one steering mode; the shaft means being selectively displaced to one of the operating positions the steering mode selector means such that the selected one of the gear positions engages the front drive means.

6. The steering system of claim 1, further comprising at least one of a speed sensor, a wheel locking detector, a vehicle tilting detector and a wheel skidding detector for generating signals representing vehicle speed, wheel locking, vehicle body tilting and wheel skidding respectively; wherein the microcomputer means receives and processes the signals from at least one of the speed sensor, the wheel locking detector, the vehicle tilting detector and the wheel skidding detector to modify the output signals thereof.

7. The steering system of claim 1, wherein the distinct steering modes include:

a first steering mode for steerage of the front wheels with the rear wheels being kept at a generally neutral direction;

a second steering mode for steerage of the rear wheels with the front wheels being kept at the generally neutral direction;

a third steering mode for combined steerage of the front wheels and the rear wheels in generally similar directions; and a fourth steering mode for combined steerage of the front wheels and the rear wheels in generally opposite directions.

8. The steering system of claim 1, wherein the steering mode selector means provides a specific choice among a plurality of distinct steering modes, said steering modes including at least a backward drive steering mode for steerage of the rear wheels with the front wheels being kept at a generally neutral direction; said steering system further comprising:

a transmission device shiftable to at least a reverse transmission gear position; and a switch means, activated by the transmission device being shifted to the reverse transmission gear position and connected with the steering mode selector means for effecting the steering mode selector means to automatically select the backward drive steering mode.

9. The steering system of claim 1, wherein the shaft means includes at least two filled gear positions, one of the two filled gear positions including a gear for providing a pre-determined proportion of steering efficiency as compared with steering efficiency provided by a gear included in another of the two filled gear positions.

10. A steering system for a vehicle with front wheels and rear wheels, said steering system comprising:

a rotatable steering wheel;

a selectable steering mode selector means for providing a specific choice among a plurality of distinct steering modes and generating signals thereof;

a steering wheel rotation sensor means for sensing rotation of the steering wheel and generating signals thereof;

a front drive means operably connected with the front wheels for controlling the direction of the front wheels;

a shaft means for carrying the front drive means for controlling the direction of the front wheels, said shaft means being operably attached to and controlled by both the steering wheel and the steering mode selector means; at least two gears being disposed on the shaft means; one of the two gears providing a pre-determined proportion of steering efficiency as compared with steering efficiency provided by another of the two gears; the steering mode selector means being operable to control which of the two gears engages the front drive means;

a joint means connected with the shaft means, said joint means being movable such that the shaft means can be temporarily disengaged from the front drive means;

a microcomputer means for receiving and processing signals from both the steering wheel rotation sensor means and the steering mode selector means and generating output signals thereof; and a rear steerage executing means operably connected with the rear wheels for controlling the direction of the rear wheels, said rear steerage executing means being controlled by the output signals from the microcomputer means.

11. The steering system of claim 10, wherein the rear steerage executing means includes at least one of an electric motor and a hydraulic pressure controller.

12. The steering system of claim 10, wherein the shaft means includes a modified pinion shaft; the gears are pinion gears; and the front drive means includes a front steering rack.

13. The steering system of claim 10, wherein the shaft means includes a modified worm shaft; the gears are worm gears; and the front drive means includes a pitman arm shaft.

14. The steering system of claim 10, further comprising at least one of a speed sensor, a wheel locking detector, a vehicle tilting detector and a wheel skidding detector for generating signals representing vehicle speed, wheel locking, vehicle body tilting and wheel skidding respectively; wherein the microcomputer means receives and processes the signals from at least one of the speed sensor, the wheel locking detector, the vehicle tilting detector and the wheel skidding detector to modify the output signals thereof.

15. The steering system of claim 10, wherein the distinct steering modes include:

a first steering mode for steerage of the front wheels with the rear wheels being kept at a generally neutral direction;

a second steering mode for steerage of the rear wheels with the front wheels being kept at the generally neutral direction;

a third steering mode for combined steerage of the front wheels and the rear wheels in generally similar directions.

a fourth steering mode for combined steerage of the front wheels and the rear wheels in generally opposite directions.

16. The steering system of claim 10, wherein the steering mode selector means provides a specific choice among a plurality of distinct steering modes, said steering modes including at least a backward drive steering mode for steerage of the rear wheels with the front wheels being kept at a generally neutral direction; said steering system further comprising:

a transmission device shiftable to at least a reverse transmission gear position; and a switch means, activated by the transmission device being shifted to the reverse transmission gear position and connected with the steering mode selector means for effecting the steering mode selector means to automatically select the backward drive steering mode.

17. A steering system for a vehicle with front wheels and rear wheels, said steering system comprising:

a rotatable steering wheel;

a selectable steering mode selector means for providing a specific choice among a plurality of distinct steering modes and generating signals thereof;

a steering wheel rotation sensor means for sensing rotation of the steering wheel and generating signals thereof;

a front drive means operably connected with the front wheels for controlling the direction of the front wheels;

a shaft means for carrying the front drive means for controlling the direction of the front wheels, said shaft means being operably controlled by the steering wheel;

a joint means connected with the shaft means, said joint means being controlled by the steering mode selector means, said joint means being movable such that the shaft means can be temporarily disengaged from the the front drive means;

a microcomputer means for receiving and processing signals from both the steering wheel rotation sensor means and the steering mode selector means and generating output signals thereof; and a rear steerage executing means operably connected with the rear wheels for controlling the direction of the rear wheels, said rear steerage executing means being controlled by the output signals from the microcomputer means.

18. The steering system of claim 17, wherein the rear steerage executing means includes at least one of an electric motor and a hydraulic pressure controller.

19. The steering system of claim 17, wherein the shaft means includes a modified pinion shaft and at least a pinion gear; and the front drive means includes a front steering rack.

20. The steering system of claim 17, wherein the shaft means includes a modified worm shaft and at least a worm gear; and the front drive means includes a pitman arm shaft.

21. The steering system of claim 17, further comprising at least one of a speed sensor, a wheel locking detector, a vehicle tilting detector and a wheel skidding detector for generating signals representing vehicle speed, wheel locking, vehicle body tilting and wheel skidding respectively; wherein the microcomputer means receives and processes the signals from at least one of the speed sensor, the wheel locking detector, the vehicle tilting detector and the wheel skidding detector to modify the output signals thereof.

22. The steering system of claim 17, wherein the distinct steering modes include:

a first steering mode for steerage of the front wheels with the rear wheels being kept at a generally neutral direction;

a second steering mode for steerage of the rear wheels with the front wheels being kept at the generally neutral direction;

a third steering mode for combined steerage of the front wheels and the rear wheels in generally similar directions.

a fourth steering mode for combined steerage of the front wheels and the rear wheels in generally opposite directions.

23. The steering system of claim 17, wherein the steering mode selector means provides a specific choice among a plurality of distinct steering modes, said steering modes including at least a backward drive steering mode for steerage of the rear wheels with the front wheels being kept at a generally neutral direction; said steering system further comprising:

a transmission device shiftable to at least a reverse transmission gear position; and a switch means, activated by the transmission device being shifted to the reverse transmission gear position and connected with the steering mode selector means for effecting the steering mode selector means to automatically select the backward drive steering mode.

* * * * *